US011621579B2

(12) United States Patent
Nagabhushanrao et al.

(10) Patent No.: US 11,621,579 B2
(45) Date of Patent: Apr. 4, 2023

(54) LINE-INTERACTIVE UNINTERRUPTIBLE POWER SUPPLY WITH INTEGRATED CHARGER

(71) Applicant: SCHNEIDER ELECTRIC IT CORPORATION, Foxboro, MA (US)

(72) Inventors: Pradeep Tolakanahalli Nagabhushanrao, Bangalore (IN); Silvaraju Kunchapu, Bangalore (IN)

(73) Assignee: SCHNEIDER ELECTRIC IT CORPORATION, Foxboro, MA (US)

(*) Notice: Subject to any disclaimer, the term of this patent is extended or adjusted under 35 U.S.C. 154(b) by 36 days.

(21) Appl. No.: 17/347,766

(22) Filed: Jun. 15, 2021

(65) Prior Publication Data

US 2022/0399745 A1    Dec. 15, 2022

(51) Int. Cl.
*H02J 9/06* (2006.01)
*H02J 7/00* (2006.01)
*H02M 1/42* (2007.01)

(52) U.S. Cl.
CPC ............ *H02J 9/06* (2013.01); *H02J 7/00712* (2020.01); *H02M 1/42* (2013.01)

(58) Field of Classification Search
CPC .................................................... H02M 3/158
See application file for complete search history.

(56) References Cited

U.S. PATENT DOCUMENTS

| | | | |
|---|---|---|---|
| 5,610,805 A * | 3/1997 | Gupta | H02M 5/458 307/66 |
| 7,141,892 B2 | 11/2006 | Dai et al. | |
| 9,595,876 B2 | 3/2017 | Nielsen | |
| 2004/0085785 A1 | 5/2004 | Taimela | |

(Continued)

FOREIGN PATENT DOCUMENTS

| | | |
|---|---|---|
| EP | 2889996 A1 | 7/2015 |
| EP | 2903125 B1 | 8/2015 |

(Continued)

OTHER PUBLICATIONS

Extended European Search Report from corresponding European Application No. 22176714.8 dated Nov. 11, 2022.

(Continued)

*Primary Examiner* — Daniel Kessie
(74) *Attorney, Agent, or Firm* — Lando & Anastasi, LLP

(57) ABSTRACT

Aspects of the disclosure provide an uninterruptible power supply comprising an input configured to receive input power from an input-power source, the input having a mains neutral connection coupled to a reference node, an energy-storage-device interface configured to be coupled to an energy-storage device to provide back-up power, the energy-storage-device interface having an energy-storage-device neutral connection coupled to the reference node, an output configured to provide output power derived from at least one of the input power and the back-up power, a power-factor-correction circuit (PFC) comprising a PFC input, a capacitor coupled to the PFC and being galvanically coupled to the energy-storage-device interface, a bidirectional converter coupled to the input and coupled to the energy-storage-device interface, and a switch coupled to the energy-storage-device interface and to the PFC input.

19 Claims, 15 Drawing Sheets

(56) References Cited

U.S. PATENT DOCUMENTS

| | | |
|---|---|---|
| 2005/0162137 A1 | 7/2005 | Tracy et al. |
| 2013/0026835 A1* | 1/2013 | Ghosh .................... H02M 1/10 |
| | | 307/64 |
| 2017/0104365 A1 | 4/2017 | Ghosh et al. |

FOREIGN PATENT DOCUMENTS

| | | |
|---|---|---|
| FR | 3076123 B1 | 1/2021 |
| WO | 2009126405 A2 | 10/2009 |

OTHER PUBLICATIONS

Jinn-Chang Wu et al: "A New UPS Scheme Provides Harmonic Suppression and Input Power Factor Correction", IEEE Transactions on Industrial Electronics, IEEE Service Center, Piscataway, NJ, USA, vol. 42, No. 6, Dec. 1, 1995 (Dec. 1, 1995), pp. 629-635, XP000557996, ISSN: 0278-0046, DOI: 10.1109/41.475503.

* cited by examiner

LINE-INTERACTIVE UNINTERRUPTIBLE POWER SUPPLY WITH INTEGRATED CHARGER

BACKGROUND

1. Field of the Disclosure

At least one example in accordance with the present disclosure relates generally to power devices, such as uninterruptible power supplies (UPSs).

2. Discussion of Related Art

Power devices, such as UPSs, may be used to provide regulated, uninterrupted power for sensitive and/or critical loads, such as computer systems and other data processing systems. Existing UPSs include online UPSs, offline UPSs, line-interactive UPSs, as well as others. Line-interactive and online UPSs provide conditioned AC power as well as back-up AC power upon interruption of a primary source of AC power. Offline UPSs typically do not provide conditioning of input AC power, but do provide back-up AC power upon interruption of the primary AC power source.

SUMMARY

According to at least one aspect of the present disclosure, an uninterruptible power supply is provided comprising an input configured to receive input power from an input-power source, the input having a mains neutral connection coupled to a reference node, an energy-storage-device interface configured to be coupled to an energy-storage device to provide back-up power, the energy-storage-device interface having an energy-storage-device neutral connection coupled to the reference node, an output configured to provide output power derived from at least one of the input power and the back-up power, a power-factor-correction circuit (PFC) comprising a PFC input, a capacitor coupled to the PFC and being galvanically coupled to the energy-storage-device interface, a bidirectional converter coupled to the input and coupled to the energy-storage-device interface, and a switch coupled to the energy-storage-device interface and to the PFC input.

In some examples, a voltage of the output power is independent of a voltage of the input power. In at least one example, the switch includes a first connection coupled to the PFC input, and a second connection configured to be coupled to the energy-storage-device interface. In at various examples, the uninterruptible power supply includes a first power switch coupled between the energy-storage-device interface and the second connection of the switch. In some examples, the uninterruptible power supply includes a second power switch coupled to a first connection of the capacitor, an inductor coupled between the first power switch and the second power switch, and a switching device coupled between the inductor and a second connection of the capacitor.

In at least one example, the uninterruptible power supply includes at least one controller, and the at least one controller is further configured to control, in a mains mode during a positive half-cycle of the input power, the first power switch and the second power switch to provide a boost current from the capacitor to the inductor through the first power switch and the second power switch. In various examples, the at least one controller is further configured to control, in the mains mode during the positive half-cycle of the input power, the first power switch to provide a freewheeling current from the inductor to the energy-storage-device interface through the first power switch and the switching device.

In some examples, the uninterruptible power supply includes at least one controller, and the at least one controller is further configured to control, in a mains mode during a negative half-cycle of the input power, the second power switch and the switching device to provide a boost current from the capacitor to the inductor through the second power switch and the switching device. In at least one example, the at least one controller is further configured to control, in the mains power during the negative half-cycle of the input power, the first power switch and the second power switch to provide a freewheeling current from the inductor through the first power switch and the second power switch to charge the energy-storage device.

In various examples, the uninterruptible power supply includes an inductor coupled between the capacitor and the first connection of the switch, and further includes at least one controller, the at least one controller being further configured to control, during a positive half-cycle of the output power during a back-up mode, the first power switch and the switch to provide a boost current from the energy-storage-device interface to the inductor through the first power switch and the switch. In some examples, the at least one controller is further configured to control, during the positive half-cycle of the output power during the back-up mode, the first power switch and the switch to provide a freewheeling current from the inductor through the first power switch and the switch to charge the capacitor.

In at least one example, the uninterruptible power supply includes an inductor coupled between a first connection of the capacitor and the first connection of the switch, and a second power switch coupled between the second connection of the switch and a second connection of the capacitor. In various examples, the uninterruptible power supply includes at least one controller, and the at least one controller is further configured to control, during a negative half-cycle of the output power during a back-up mode, the first power switch and the switch to provide a boost current from the energy-storage-device interface to the inductor through the first power switch and the switch.

In some examples, the at least one controller is further configured to control, during the negative half-cycle of the output power during the back-up mode, the second power switch and the switch to provide a freewheeling current from the inductor through the second power switch and the switch to charge the capacitor. In at least one example, the input includes a mains neutral connection coupled to a reference node, and the energy-storage-device interface includes an energy-storage-device neutral connection coupled to the reference node. In various examples, the uninterruptible power supply includes at least one controller configured to control, during a positive half-cycle of the input power, the bidirectional converter to charge the energy-storage device with power derived from the capacitor, and control, during a negative half-cycle of the input power, the bidirectional converter to charge the energy-storage device with power derived from the capacitor.

According to at least one example of the disclosure, a non-transitory computer-readable medium storing thereon sequences of computer-executable instructions are provided for operating an uninterruptible power supply including an input to receive input power and having a mains neutral connection coupled to a reference node, an energy-storage-device interface having an energy-storage-device neutral connection coupled to the reference node and configured to be coupled to an energy-storage device, an output to provide output power, a power-factor-correction circuit (PFC) comprising a PFC input coupled to a capacitor galvanically coupled to the energy-storage-device interface, a bidirectional converter coupled to the input and to the energy-storage-device interface, and a switch coupled to the energy-storage-device interface and to the PFC input, the sequences of computer-executable instructions including instructions that instruct at least one processor to select, based on input power received at the input, a mode of operation including one of a back-up mode or a mains mode, control, during a positive half-cycle of the input power in the mains mode, the bidirectional converter to charge the energy-storage device with power derived from the capacitor, and control, during a negative half-cycle of the input power in the mains mode, the bidirectional converter to charge the energy-storage device with power derived from the capacitor.

In some examples, the uninterruptible power supply further includes a first power switch coupled between the energy-storage-device interface and the switch, a second power switch coupled to a first connection of the capacitor, an inductor coupled between the first power switch and the second power switch, and a switching device coupled between the inductor and a second connection of the capacitor, and the instructions further instruct the at least one processor to control, in the mains mode during a positive half-cycle of the input power, the first power switch and the second power switch to provide a boost current from the capacitor to the inductor through the first power switch and the second power switch, and control, in the mains mode during the positive half-cycle of the input power, the first power switch to provide a freewheeling current from the inductor to the energy-storage device through the first power switch and the switching device.

In at least one example, the uninterruptible power supply further includes a first power switch coupled between the energy-storage-device interface and the switch, a second power switch coupled to a first connection of the capacitor, an inductor coupled between the first power switch and the second power switch, and a switching device coupled between the inductor and a second connection of the capacitor, and the instructions further instruct the at least one processor to control, in the mains mode during a negative half-cycle of the input power, the second power switch and the switching device to provide a boost current from the capacitor to the inductor through the second power switch and the switching device, and control, in the mains power during the negative half-cycle of the input power, the first power switch and the second power switch to provide a freewheeling current from the inductor through the first power switch and the second power switch to charge the energy-storage device.

According to aspects of the disclosure, a method of assembling an uninterruptible power supply is provided comprising providing an uninterruptible power supply having an input configured to receive input power from an input-power source and having a mains neutral connection, an energy-storage-device interface configured to be coupled to an energy-storage device to provide back-up power and having an energy-storage-device neutral connection, an output configured to provide output power derived from at least one of the input power and the back-up power, a power-factor-correction circuit (PFC) comprising a PFC input, a capacitor, a bidirectional converter, and a switch, the method further comprising coupling the mains neutral connection and the energy-storage-device neutral connection to a reference node, coupling the capacitor to the PFC, galvanically coupling the capacitor to the energy-storage-device interface, coupling the bidirectional converter to the input and to the energy-storage-device interface, and coupling the switch to the energy-storage-device interface and to the PFC input.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
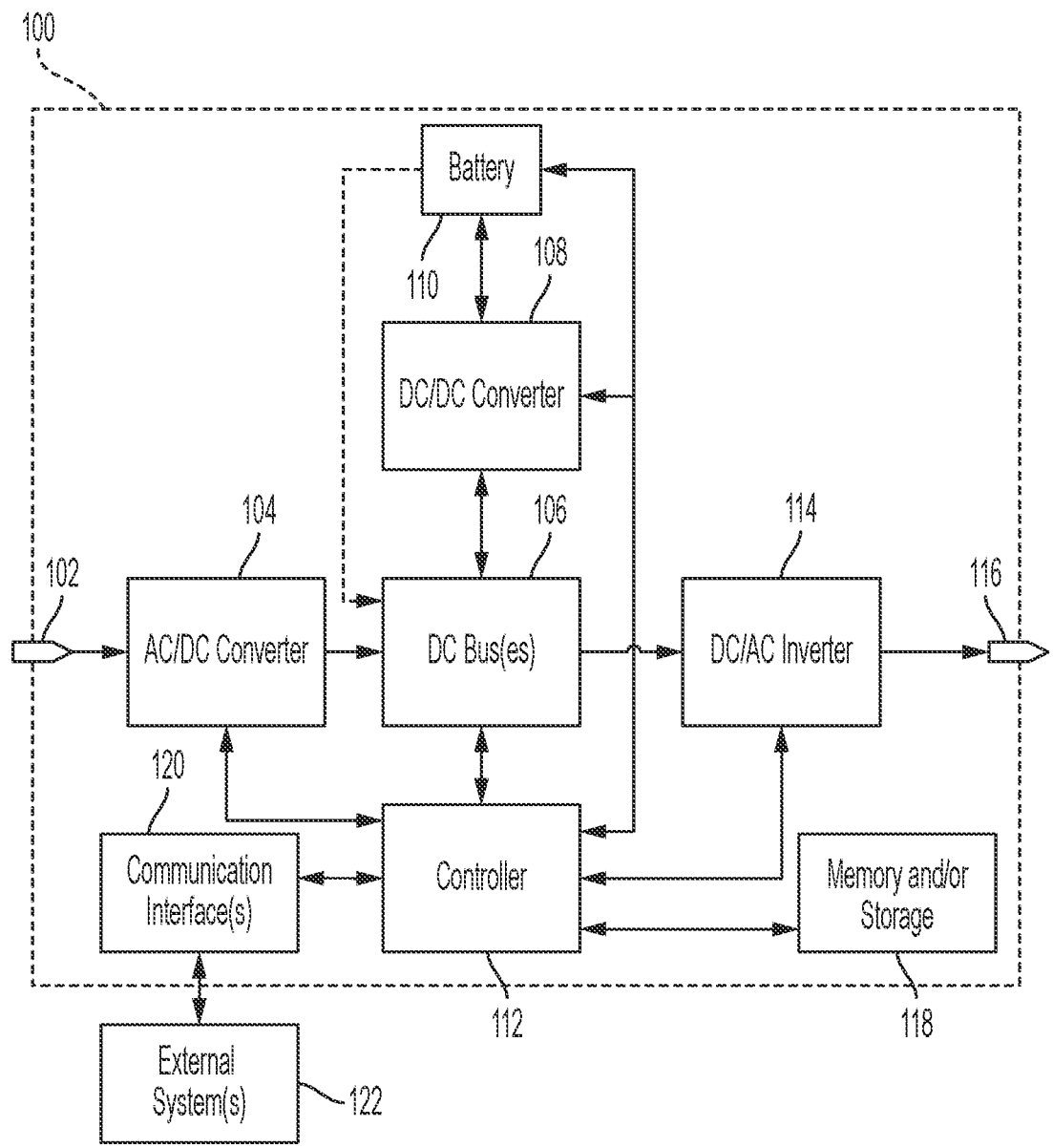
FIG. 1 illustrates a block diagram of an uninterruptible power supply (UPS) according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, uninterruptible power supplies (UPSs) may provide regulated, uninterrupted power to loads, such as critical and/or sensitive loads. In some examples, line-interactive UPSs are configured to be coupled to a source of alternating-current (AC) power, a source of direct-current (DC) power, and a load. The line-interactive UPS may provide output power to the load, with the output power being derived from one or both of the sources of AC power or DC power. When providing output power derived from the source of AC power, the line-interactive UPS may regulate the received AC power without switching to the source of DC power to correct abnormalities (for example, voltage-level abnormalities) in the received AC power.

In various examples, a line-interactive UPS may be configured to receive power from the source of DC power (for example, a battery) and provide output power to the load derived from the source of DC power. Similarly, the line-interactive UPS may be configured to receive power from the source of AC power (for example, a mains input) and provide charging power to the source of DC power to charge the source of DC power. In some examples, the line-interactive UPS may include a charger component configured to charge the source of DC power using, for example, power derived from the source of AC power.

FIG. 1 is a block diagram of a UPS 100. The UPS 100 includes an input 102, an AC/DC converter 104, one or more DC busses 106, a DC/DC converter 108, a battery 110, a controller 112, a DC/AC inverter 114, an output 116, a memory and/or storage 118, and one or more communication interfaces 120 ("communication interfaces 120"), which may be communicatively coupled to one or more external systems 122 ("external systems 122"). The input 102 is coupled to the AC/DC converter 104 and to an AC power source (not pictured), such as an AC mains power supply. The AC/DC converter 104 is coupled to the input 102 and to the one or more DC busses 106, and is communicatively coupled to the controller 112. The one or more DC busses 106 are coupled to the AC/DC converter 104, the DC/DC converter 108, and to the DC/AC inverter 114, and are communicatively coupled to the controller 112. In some examples, the one or more DC busses 106 are coupled to the battery 110. The DC/DC converter 108 is coupled to the one or more DC busses 106 and to the battery 110, and is communicatively coupled to the controller 112. The battery 110 is coupled to the DC/DC converter 108 and, in some examples, to the one or more DC busses 106. The DC/AC inverter 114 is coupled to the one or more DC busses 106 and to the output 116, and is communicatively coupled to the controller 112. The output 116 is coupled to the DC/AC inverter 114, and is configured to be coupled to an external load (not pictured). The controller 112 is communicatively coupled to the AC/DC converter 104, the one or more DC busses 106, the DC/DC converter 108, the battery 110, the DC/AC inverter 114, the memory and/or storage 118, and the communication interfaces 120.

The input 102 is configured to be coupled to an AC mains power source and to receive input AC power having an input voltage level. The UPS 100 is configured to operate in different modes of operation based on the input voltage of the AC power provided to the input 102. The controller 112 may determine a mode of operation in which to operate the UPS 100 based on whether the input voltage of the AC power is acceptable. The controller 112 may include or be coupled to one or more sensors configured to sense parameters of the input voltage. For example, the controller 112 may include or be coupled to one or more sensors configured to sense a voltage level of the AC power received at the input 102.

When AC power provided to the input 102 is acceptable (for example, by having parameters, such as an input-voltage value, that meet specified values, such as by falling within a range of acceptable input-voltage values), the controller 112 controls components of the UPS 100 to operate in a normal mode of operation. In the normal mode of operation, AC power received at the input 102 is provided to the AC/DC converter 104. The AC/DC converter 104 converts the AC power into DC power and provides the DC power to the one or more DC busses 106. In some examples, the AC/DC converter 104 provides power-factor correction to the AC power. The one or more DC busses 106 distribute the DC power to the DC/DC converter 108 and to the DC/AC inverter 114. In some examples, the DC/DC converter 108 converts the received DC power and provides the converted DC power to the battery 110 to charge the battery 110. For example, the DC/DC converter 108 may charge the battery 110 if a charge level of the battery 110 is below a charge threshold. The DC/AC inverter 114 receives DC power from the one or more DC busses 106, converts the DC power into regulated AC power, and provides the regulated AC power to the output 116 to be delivered to a load.

When AC power provided to the input 102 from the AC mains power source is not acceptable (for example, by having parameters, such as an input voltage value, that do not meet specified values, such as by falling outside of a range of acceptable input voltage values), the controller 112 controls components of the UPS 100 to operate in a back-up mode of operation. In the back-up mode of operation, DC power is discharged from the battery 110. In some examples, the DC power is discharged to the DC/DC converter 108. The DC/DC converter 108 converts the received DC power and distributes the DC power amongst the one or more DC busses 106. In other examples, the battery 110 may be coupled to the one or more DC busses 106 and may directly discharge DC power to the one or more DC busses 106, such as by bypassing the DC/DC converter 108. For example, the DC/DC converter 108 may be a unidirectional charger configured to charge the battery 110, but not configured to receive power from the battery 110. The one or more DC busses 106 provide power received from the battery 110 and/or the DC/DC converter 108 to the DC/AC inverter 114. The DC/AC inverter 114 receives the DC power from the one or more DC busses 106, converts the DC power into regulated AC power, and provides the regulated AC power to the output 116.

The controller 112 may store information in, and/or retrieve information from, the memory and/or storage 118. For example, the controller 112 may store information indicative of sensed parameters (for example, input-voltage values of the AC power received at the input 102) in the memory and/or storage 118. The controller 112 may further receive information from, or provide information to, the communication interfaces 120. The communication interfaces 120 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 122, or other entities, such as human beings. The external systems 122 may include any device, component, module, and so forth, that is external to the UPS 100, such as a server, database, laptop computer, desktop computer, tablet computer, smartphone, central controller or data-aggregation system, other UPSs, and so forth.

As discussed above, the UPS 100 may be implemented as a line-interactive UPS configured to adjust an input voltage received at the input 102 without switching to the battery 110 during a mains mode of operation. A line-interactive UPS may be implemented in one of several topologies. For example, in a first topology, the input 102 and the battery 110 may share a neutral connection. The DC/DC converter 108 may include an isolation transformer configured to galvanically isolate the battery 110 from the one or more DC busses 106 and components coupled thereto, including one or more DC-bus capacitors. Although the common neutral connection of the input 102 and the battery 110 may facilitate compliance with electromagnetic compatibility (EMC) and electromagnetic interference (EMI) requirements, a component count of the first topology may be high and a physical footprint of the DC/DC converter 108 may be large to accommodate the isolation transformer.

In a second topology, the input 102 and the battery 110 may not share a neutral connection, such that a negative connection of the battery 110 is floating with respect to a neutral point of the input 102. The DC/DC converter 108 may be implemented as a unidirectional charger configured to charge the battery 110, and the battery 110 may discharge stored DC power directly to the one or more DC busses 106. Although a component count and physical footprint of the second topology may be reduced relative to the first topology, the floating negative of the battery 110 may make compliance with EMC and EMI requirements difficult.

In light of the foregoing, examples of the disclosure provide a power-device topology in which a negative connection of a battery is shared with a neutral of an input-power connection, and in which a number of components is reduced relative to examples in which an isolation transformer is implemented. In some examples, the power device is a UPS, such as a line-interactive UPS. For example, the line-interactive UPS may include a voltage-independent line-interactive UPS.

Figure 2:
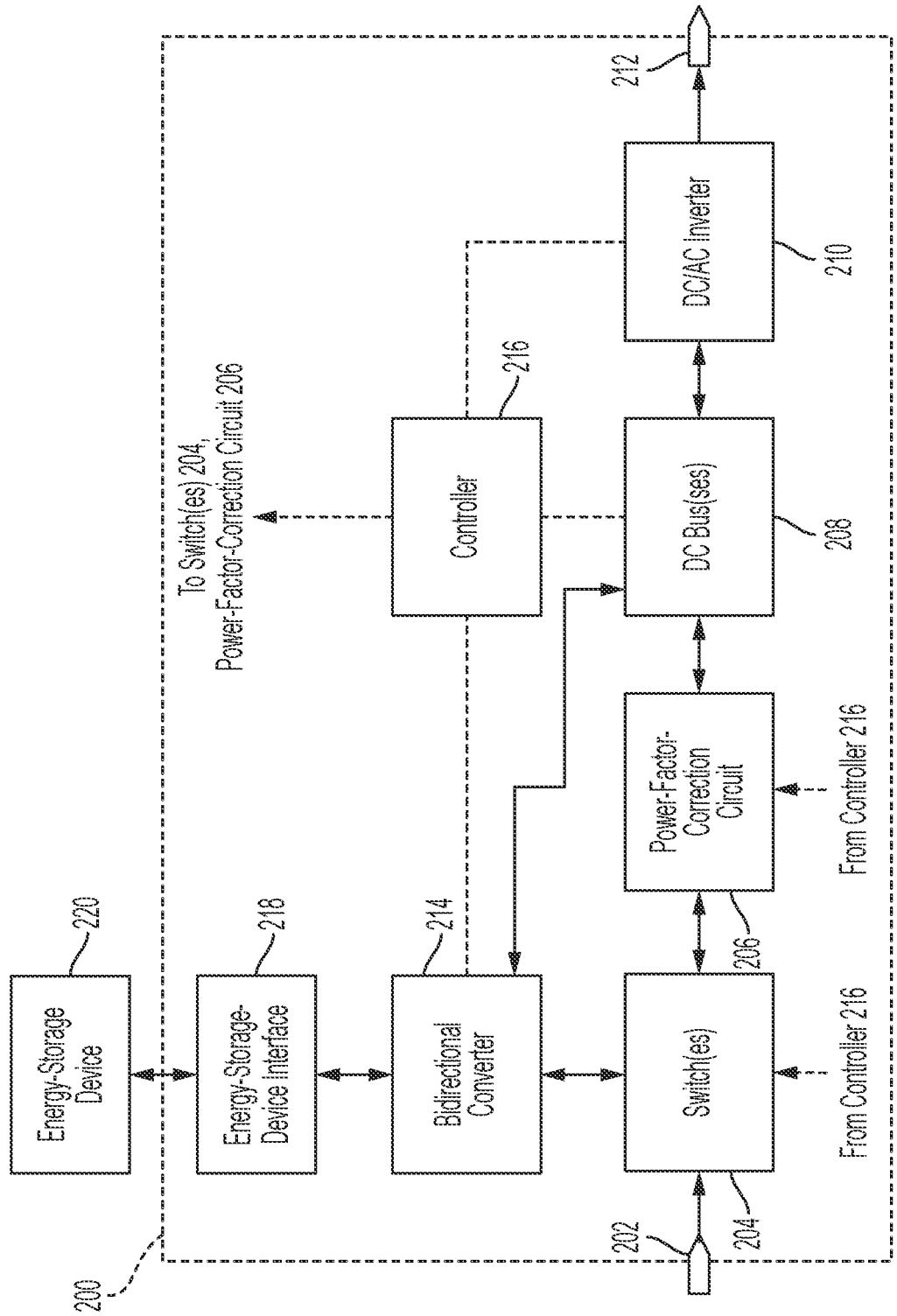
FIG. 2 illustrates a block diagram of a UPS according to another example.

FIG. 2 illustrates a block diagram of a UPS 200 according to an example. In at least one example, the UPS 200 is a voltage-independent UPS. For example, the UPS 200 may be a voltage-independent line-interactive UPS. The UPS 200 includes an input 202, one or more switches 204 ("switches 204"), a power-factor-correction circuit (PFC) 206, one or more DC busses 208 ("DC busses 208"), a DC/AC inverter 210, an output 212, a bidirectional converter 214, a controller 216, and an energy-storage-device interface 218, and is configured to be coupled to an energy-storage device 220.

The input 202 is coupled to the switches 204, and is configured to be coupled to an AC-power source (for example, a utility mains source; not illustrated). The switches 204 are coupled to the PFC 206 and the bidirectional converter 214, and are communicatively coupled to the controller 216. The PFC 206 is coupled to the switches 204 and the DC busses 208, and is configured to be coupled to the controller 216. The DC busses 208 are coupled to the PFC 206, the DC/AC inverter 210, and the bidirectional converter 214, and are communicatively coupled to the controller 216. The DC/AC inverter 210 is coupled to the DC busses 208 and the output 212, and is communicatively coupled to the controller 216. The output 212 is coupled to the DC/AC inverter 210, and is configured to be coupled to a load (not illustrated).

The bidirectional converter 214 is coupled to the switches 204, the DC busses 208, and the energy-storage-device interface 218, and is communicatively coupled to the controller 216. The controller 216 is communicatively coupled to the switches 204, the PFC 206, the DC busses 208, the DC/AC inverter 210, and the bidirectional converter 214. In some examples, the controller 216 may be similar to the controller 112 and may be coupled to additional devices and/or components to which the controller 112 is coupled, such as components similar to the memory and/or storage 118, communication interfaces 120, external systems 122, and/or one or more sensors, which are omitted for purposes of explanation. The energy-storage-device interface 218 is coupled to the bidirectional converter 214, and is configured to be coupled to the energy-storage device 220. The energy-storage device 220 is configured to be coupled to the UPS 200 via the energy-storage-device interface 218.

Figure 3:
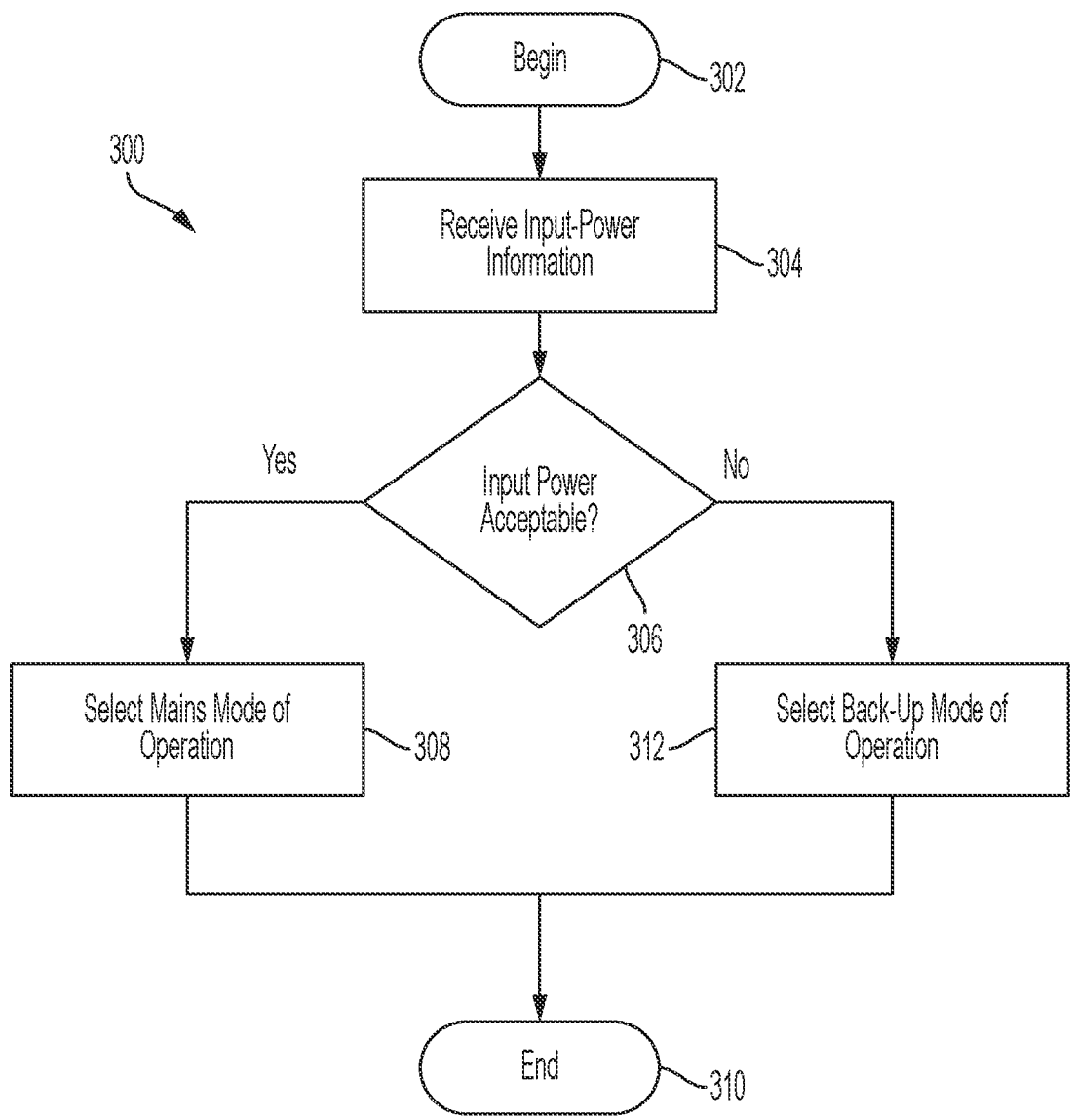
FIG. 3 illustrates a process of operating the UPS of FIG. 2 according to an example.

FIG. 3 illustrates a process 300 of controlling the UPS 200 according to an example. For example, the process 300 may be executed at least in part by the controller 216.

At act 302, the process 300 begins.

At act 304, the controller 216 receives input-power information. The input-power information may include information indicative of power received at the input 202. In some examples, the input power includes AC power received from an AC-power source, such as a utility mains. The input-power information may include information indicative of one or more of a voltage level, a current level, a frequency, a power factor, or other parameters, of the power received at the input 202.

The controller 216 may include, or be coupled to, one or more sensors configured to acquire the input-power information. For example, the input 202 may include, or be coupled to, one or more current or voltage sensors configured to acquire input-power information. The controller 216 may acquire the input-power information repeatedly, periodically, aperiodically, or on another basis. For example, the one or more sensors may each send input-power information to the controller 216 repeatedly, with or without a request from the controller 216.

At act 306, the controller 216 determines, based on the input-power information, whether the input power is acceptable. In some examples, the input power may be considered acceptable if parameters of the input power indicated by the input-power information are within certain ranges, such as by having a voltage level within a certain range of voltage levels. If the input power is acceptable (306 YES), then the process 300 continues to act 308.

At act 308, the controller 216 selects a mains mode of operation based on the input power being acceptable. In the mains mode of operation, the controller 216 controls the UPS 200 to provide output power to the output 212 derived from power received at the input 202. For example, the output power provided to the output 212 may be derived from utility-mains AC power. In some examples, the controller 216 may control the UPS 200 to charge the energy-storage device 220 with power derived from the input 202. For example, the controller 216 may control the UPS 200 to charge the energy-storage device 220 if a charge level of the energy-storage device 220 is below a threshold level of charge. In some examples, the controller 216 may control the bidirectional converter 214 to charge the energy-storage device 220 with power derived from the input 202. An example of the mains mode of operation is provided below with respect to FIG. 5.

The process 300 continues to act 310 and, at act 310, the process 300 ends. In some examples, however, the controller 216 may repeatedly execute the process 300, such that the process 300 returns to act 302 after having selected the mains mode of operation.

Returning to act 306, if the input power is not acceptable (306 NO), then the process 300 continues to act 312. At act 312, the controller 216 selects a back-up mode of operation based on the input power not being acceptable. In the back-up mode of operation, the controller 216 controls the UPS 200 to provide output power to the output 212 derived from power received at the energy-storage-device interface 218. For example, the output power provided to the output 212 may be derived from back-up DC power provided by the energy-storage device 220. In some examples, the controller 216 may control the bidirectional converter 214 to provide output power derived from the energy-storage device 220. The bidirectional converter 214 may therefore be considered "bidirectional" inasmuch as the bidirectional converter 214 may provide power to the energy-storage device 220 at act 308, and may also draw power from the energy-storage device 220 at act 312. Conversely, certain unidirectional chargers may be configured to provide power to an energy-storage device, but may not draw power from the energy-storage device. An example of the back-up mode of operation is provided below with respect to FIG. 9.

The process 300 continues to act 310 and, at act 310, the process 300 ends. In some examples, however, the controller 216 may repeatedly execute the process 300, such that the process 300 returns to act 302 after having selected the back-up mode of operation.

Figure 4:
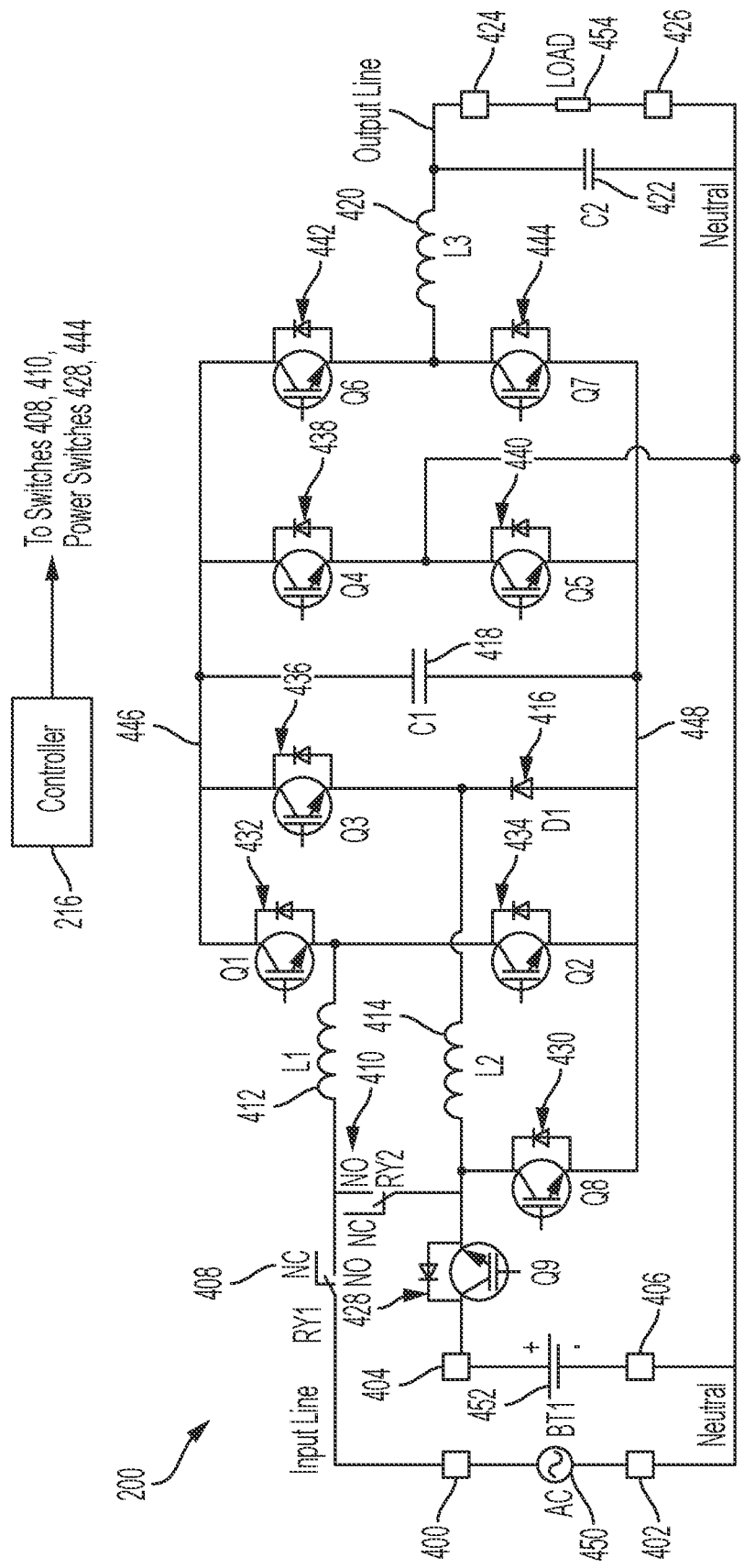
FIG. 4 illustrates a schematic diagram of the UPS of FIG. 2 according to an example.

FIG. 4 illustrates a schematic diagram of the UPS 200 according to an example. The UPS 200 includes an input line connection 400, an input neutral connection 402, a positive DC-power-source connection 404, a negative DC-power-source connection 406, a first switch 408, a second switch 410, a first inductor 412, a second inductor 414, a switching device 416, a first capacitor 418, a third inductor 420, a second capacitor 422, an output line connection 424, an output neutral connection 426, a first power switch 428, a second power switch 430, a third power switch 432, a fourth power switch 434, a fifth power switch 436, a sixth power switch 438, a seventh power switch 440, an eighth power switch 442, a ninth power switch 444, a first DC bus 446, and a second DC bus 448. The UPS 200 is configured to be coupled to an AC-power source 450, a DC-power source 452, and a load 454.

The input line connection 400 is coupled to the first switch 408, and is configured to be coupled to the AC-power source 450. The input neutral connection 402 is coupled to the negative DC-power-source connection 406, the sixth power switch 438, the seventh power switch 440, the second capacitor 422, and the output neutral connection 426, and is configured to be coupled to the AC-power source 450. The positive DC-power-source connection 404 is coupled to the first power switch 428, and is configured to be coupled to the DC-power source 452 (for example, to a positive terminal of the DC-power source 452). The negative DC-power-source connection 406 is coupled to the input neutral connection 402, the sixth power switch 438, the seventh power switch 440, the second capacitor 422, and the output neutral connection 426, and is configured to be coupled to the DC-power source 452 (for example, to a negative terminal of the DC-power source 452).

The first switch 408 is coupled to the input neutral connection 402 at a first connection, and is coupled to the second switch 410 and the first inductor 412 at a second connection. The second switch 410 is coupled to the first switch 408 and the first inductor 412 at a first connection, and is coupled to the first power switch 428, the second power switch 430, and the second inductor 414 at a second connection. The first inductor 412 is coupled to the first switch 408 and the second switch 410 at a first connection, and is coupled to the third power switch 432 and the fourth power switch 434 at a second connection. The second inductor 414 is coupled to the second switch 410, the first power switch 428, and the second power switch 430 at a first connection, and is coupled to the fifth power switch 436 and the switching device 416 at a second connection.

The switching device 416 is coupled to the second inductor 414 and the fifth power switch 436 at a first connection, and is coupled to the second DC bus 448 at a second connection. In one example, the switching device 416 is a diode having an anode and a cathode, the first connection being a cathode and the second connection being an anode. The first capacitor 418 is coupled to the first DC bus 446 at a first connection, and is coupled to the second DC bus 448 at a second connection. In various examples, the first capacitor 418 may be galvanically coupled to the positive DC-power-source connection 404 and to the negative DC-power-source connection 406 (that is, to the energy-storage-device interface 218) via the bidirectional converter 214. The third inductor 420 is coupled to the eighth power switch 442 and the ninth power switch 444 at a first connection, and is coupled to the second capacitor 422 and the output line connection 424 at a second connection. The second capacitor 422 is coupled to the third inductor 420 and the output line connection 424 at a first connection, and is coupled to the input neutral connection 402, the negative DC-power-source connection 406, the sixth power switch 438, the seventh power switch 440, and the output neutral connection 426 at a second connection. The output line connection 424 is coupled to the third inductor 420 and the second capacitor 422, and is configured to be coupled to the load 454. The output neutral connection 426 is coupled to the input neutral connection 402, the negative DC-power-source connection 406, the sixth power switch 438, the seventh power switch 440, and the second capacitor 422, and is configured to be coupled to the load 454.

The first power switch 428 is coupled to the positive DC-power-source connection 404 at a first connection, is coupled to the second switch 410, the second inductor 414, and the second power switch 430 at a second connection, and is configured to be communicatively coupled to the controller 216 at a control connection. The second power switch 430 is coupled to the first power switch 428, the second switch 410, and the second inductor 414 at a first connection, is coupled to the second DC bus 448 at a second connection, and is configured to be communicatively coupled to the controller 216 at a control connection. The third power switch 432 is coupled to the first DC bus 446 at a first connection, is coupled to the first inductor 412 and the fourth power switch 434 at a second connection, and is configured to be communicatively coupled to the controller 216 at a control connection.

The fourth power switch 434 is coupled to the third power switch 432 and the first inductor 412 at a first connection, is coupled to the second DC bus 448 at a second connection, and is configured to be communicatively coupled to the controller 216 at a control connection. The fifth power switch 436 is coupled to the first DC bus 446 at a first connection, is coupled to the second inductor 414 and the switching device 416 at a second connection, and is configured to be communicatively coupled to the controller 216 at a control connection. The sixth power switch 438 is coupled to the first DC bus 446 at a first connection, is coupled to the seventh power switch 440, the input neutral connection 402, the negative DC-power-source connection 406, the second capacitor 422, and the output neutral connection 426 at a second connection, and is configured to be communicatively coupled to the controller 216 at a control connection.

The seventh power switch 440 is coupled to the sixth power switch 438, the input neutral connection 402, the negative DC-power-source connection 406, the second capacitor 422, and the output neutral connection 426 at a first connection, is coupled to the second DC bus 448 at a second connection, and is configured to be communicatively coupled to the controller 216 at a control connection. The eighth power switch 442 is coupled to the first DC bus 446 at a first connection, is coupled to the ninth power switch 444 and the third inductor 420 at a second connection, and is configured to be communicatively coupled to the controller 216 at a control connection. The ninth power switch 444 is coupled to the eighth power switch 442 and the third inductor 420 at a first connection, is coupled to the second DC bus 448 at a second connection, and is configured to be communicatively coupled to the controller 216 at a control connection.

The first DC bus 446 is coupled to the third power switch 432, the fifth power switch 436, the first capacitor 418, the sixth power switch 438, and the eighth power switch 442. The second DC bus 448 is coupled to the second power switch 430, the fourth power switch 434, the switching device 416, the first capacitor 418, the seventh power switch 440, and the ninth power switch 444. The AC-power source 450 is configured to be coupled to the input line connection 400 and to the input neutral connection 402. The DC-power source 452 is configured to be coupled to the positive DC-power-source connection 404 and to the negative DC-power-source connection 406. The load 454 is configured to be coupled to the output line connection 424 and to the output neutral connection 426.

In one example, the input 202 includes the input line connection 400 and the input neutral connection 402. The switches 204 include the first switch 408 and the second switch 410. The PFC 206 includes the first inductor 412, the third power switch 432, and the fourth power switch 434. The DC busses 208 include the first DC bus 446, the second DC bus 448, and the first capacitor 418. The DC/AC inverter 210 includes the sixth power switch 438, the seventh power switch 440, the eighth power switch 442, and the ninth power switch 444. The output 212 includes the third inductor 420, the second capacitor 422, the output line connection 424, and the output neutral connection 426. The bidirectional converter 214 includes the first power switch 428, the second power switch 430, the second inductor 414, the fifth power switch 436, and the switching device 416. The energy-storage-device interface 218 includes the positive DC-power-source connection 404 and the negative DC-power-source connection 406. The energy-storage device 220 includes the DC-power source 452.

Figure 5:
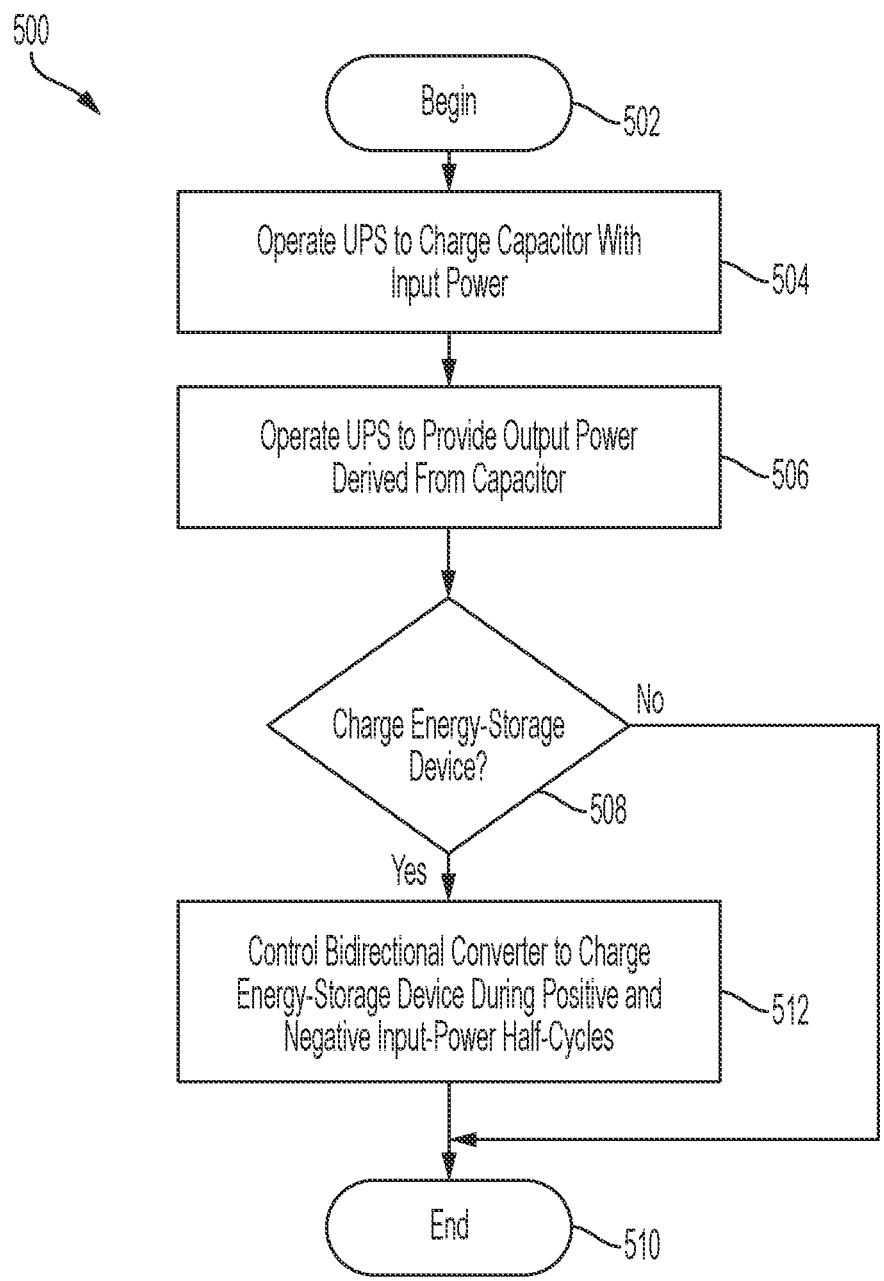
FIG. 5 illustrates a process of operating the UPS of FIG. 2 in a mains mode of operation according to an example.

As discussed above, the controller 216 may select a mode of operation of the UPS 200 and control the UPS 200 accordingly, including a mains mode of operation and a back-up mode of operation. FIG. 5 illustrates a process 500 of operating the UPS 200 in the mains mode of operation according to an example. The process 500 may be executed at least in part by the controller 216. For example, the controller 216 may operate the UPS 200 in the mains mode of operation based on having selected the mains mode of operation at act 308, above.

At act 502, the process 500 begins.

Figure 6A:
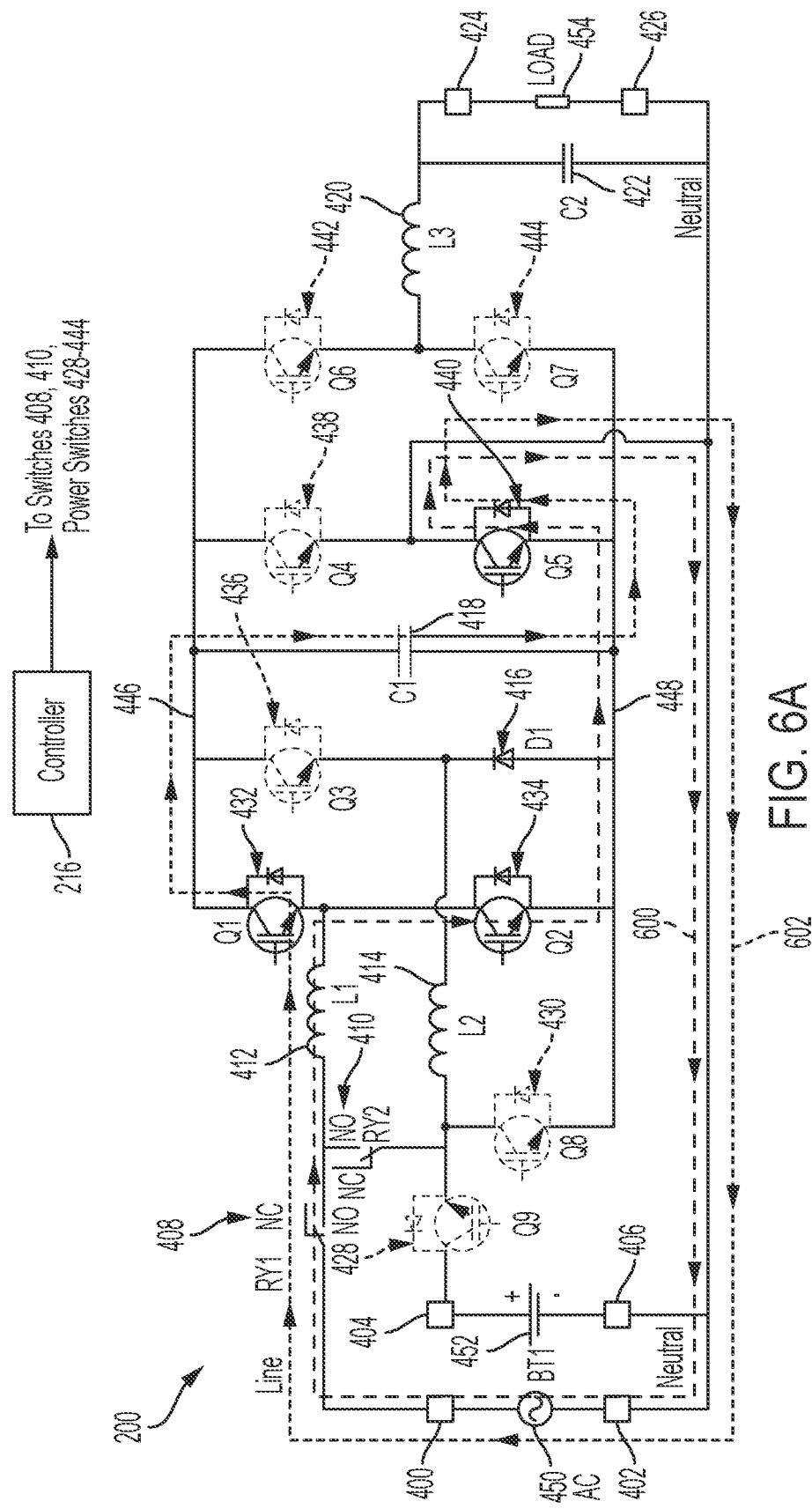
FIG. 6A illustrates a schematic diagram of the UPS of FIG. 4 charging a first capacitor during a positive half-cycle of input AC power during the mains mode of operation according to an example.
Figure 6B:
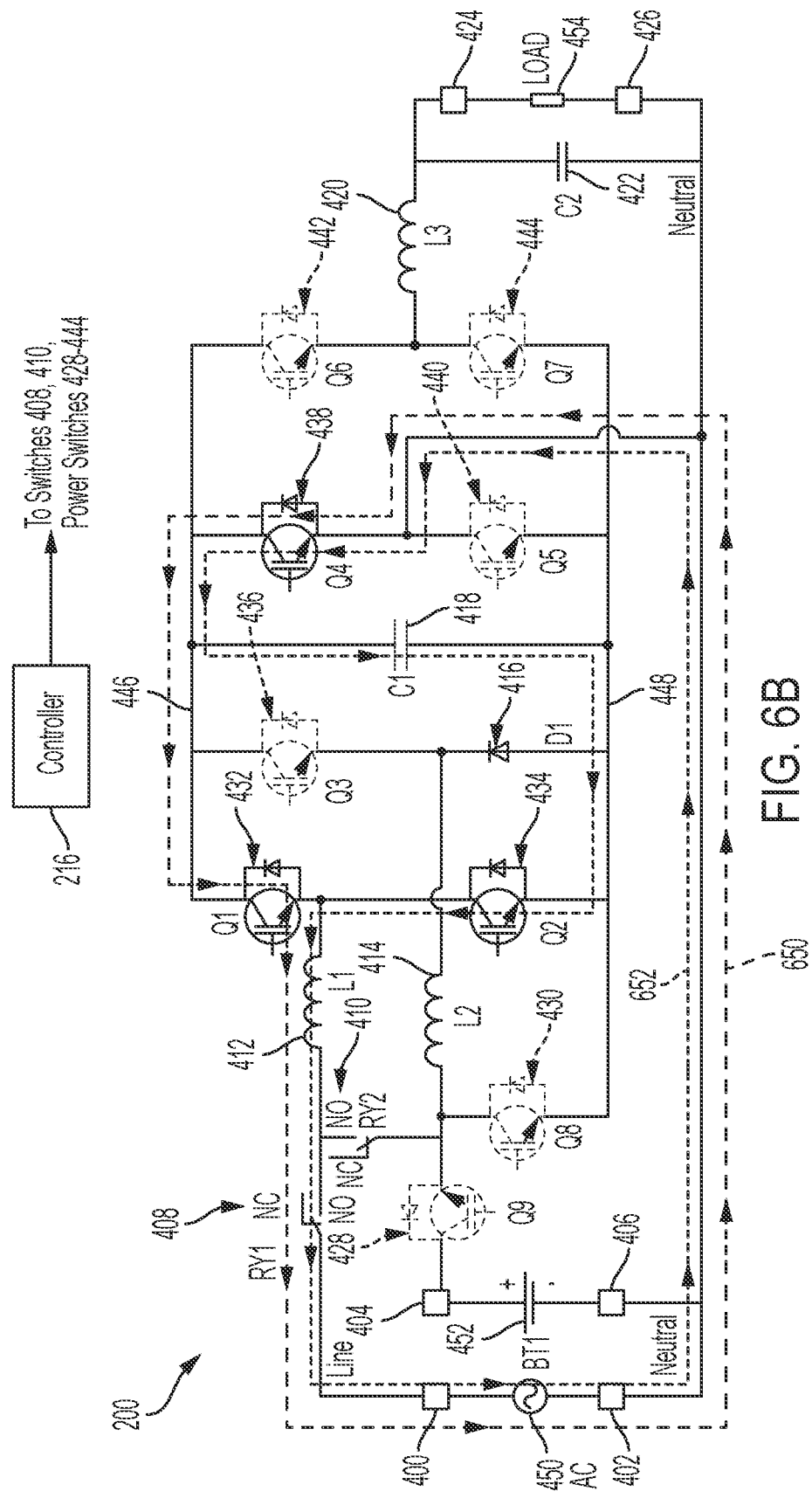
FIG. 6B illustrates a schematic diagram of the UPS of FIG. 4 charging the first capacitor during a negative half-cycle of the input AC power during the mains mode of operation according to an example.

At act 504, the controller 216 operates the UPS 200 to charge the first capacitor 418 with power derived from the AC-power source 450. Act 504 may include controlling the switches 204, PFC 206, and DC/AC inverter 210 to charge the first capacitor 418 with power derived from the AC-power source 450, as illustrated in FIGS. 6A and 6B. Operating the UPS 200 to charge the first capacitor 418 at act 504 may vary based on a polarity of voltage received from the AC-power source 450. In one example, the voltage received from the AC-power source 450 includes a positive half-cycle and a negative half-cycle.

FIG. 6A illustrates a schematic diagram of the UPS 200 charging the first capacitor 418 at act 504 during a positive half-cycle of the input AC power according to an example. A boost current 600 is provided by the AC-power source 450 to the first inductor 412, and a freewheeling current 602 is provided by the first inductor 412 to the first capacitor 418. The controller 216 maintains the seventh power switch 440 and the first switch 408 in a closed and conducting position and operates the fourth power switch 434 as a power-factor-correction switch to provide the boost current 600 from the AC-power source 450 through the input line connection 400, the first switch 408, the first inductor 412, the fourth power switch 434, the seventh power switch 440, and the input neutral connection 402. A body diode of the third power switch 432 operates as a power-factor-correction diode such that the first inductor 412 discharges the freewheeling current 602 through the third power switch 432, the first capacitor 418, the seventh power switch 440, the input neutral connection 402, the AC-power source 450, the input line connection 400, and the first switch 408 to charge the first capacitor 418.

FIG. 6B illustrates a schematic diagram of the UPS 200 charging the first capacitor 418 at act 504 during a negative half-cycle of the input AC power according to an example. A boost current 650 is provided by the AC-power source 450 to the first inductor 412, and a freewheeling current 652 is provided by the first inductor 412 to the first capacitor 418. The controller 216 maintains the sixth power switch 438 and the first switch 408 in a closed and conducting position and operates the third power switch 432 as a power-factor-correction switch to provide the boost current 650 from the AC-power source 450 through the input neutral connection 402, the sixth power switch 438, the third power switch 432, the first inductor 412, the first switch 408, and the input line connection 400. A body diode of the fourth power switch 434 operates as a power-factor-correction diode such that the first inductor 412 discharges the freewheeling current 652 through the first switch 408, the input line connection 400, the AC-power source 450, the input neutral connection 402, the sixth power switch 438, the first capacitor 418, and the body diode of the fourth power switch 434 to charge the first capacitor 418.

Figure 7A:
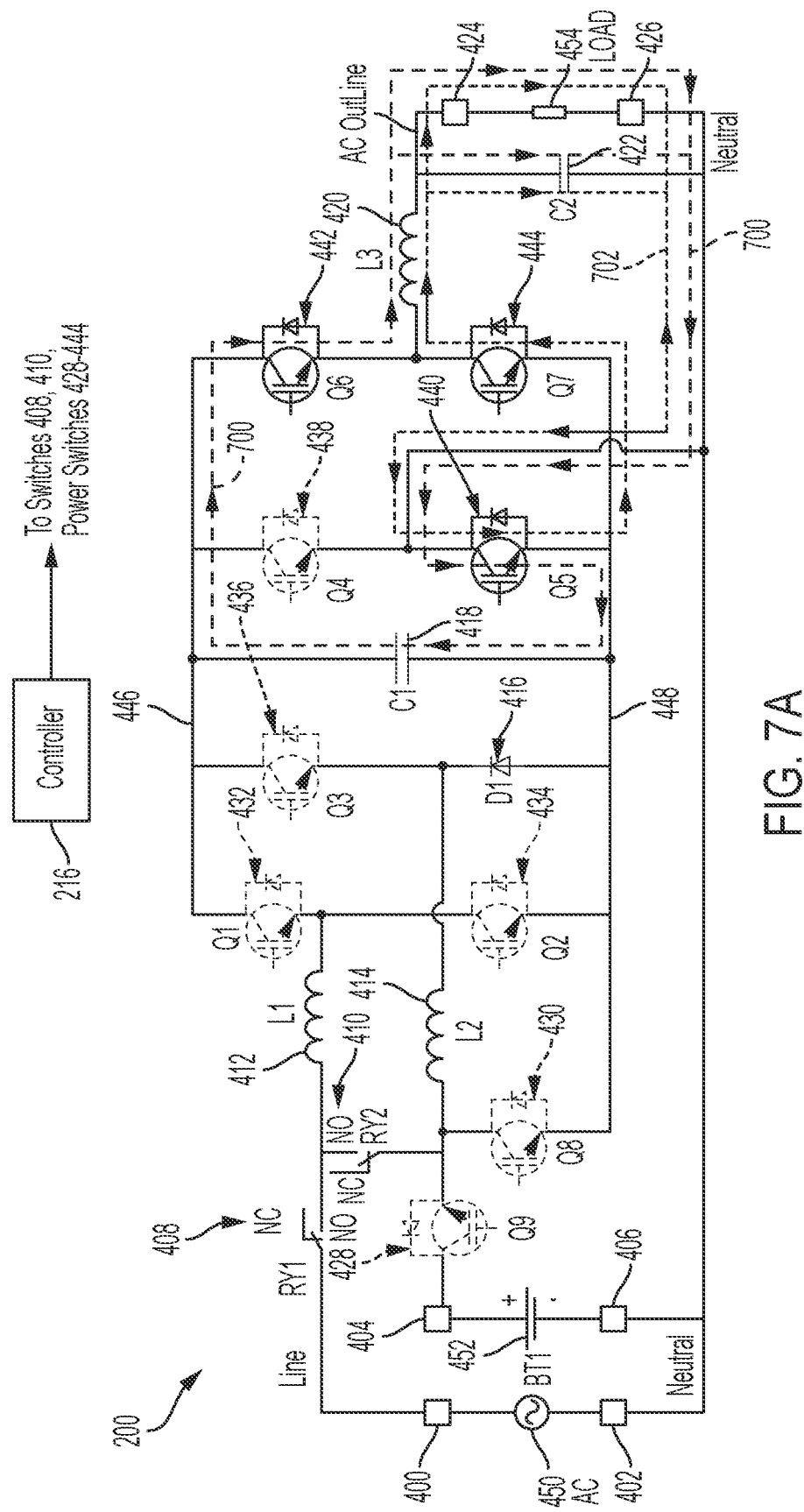
FIG. 7A illustrates a schematic diagram of the UPS of FIG. 4 providing output AC power derived from the first capacitor during a positive half-cycle of the output AC power according to an example.
Figure 7B:
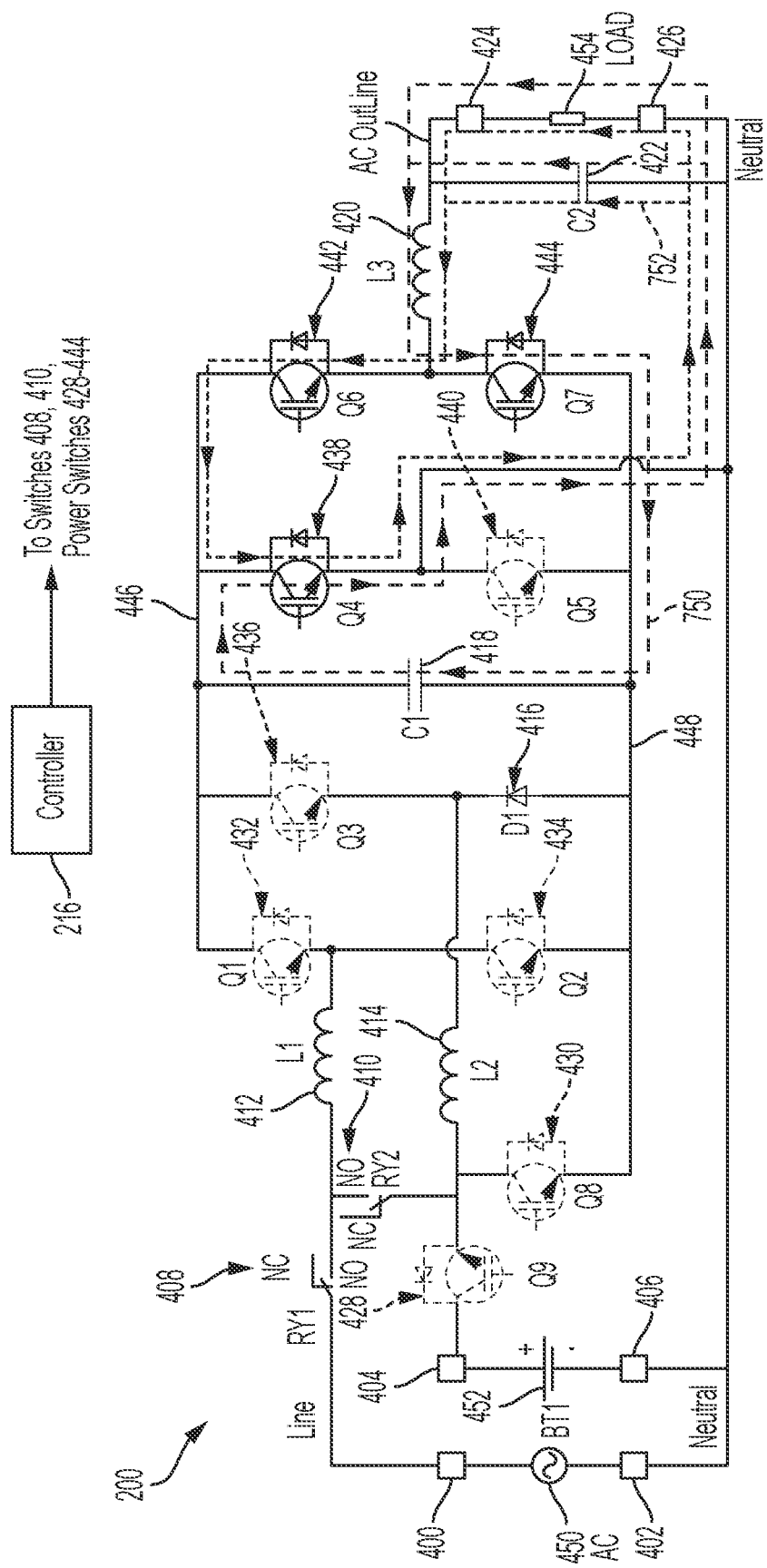
FIG. 7B illustrates a schematic diagram of the UPS of FIG. 4 providing the output AC power derived from the first capacitor during a negative half-cycle of the output AC power according to an example.

At act 506, the controller 216 operates the UPS 200 to discharge power from the first capacitor 418 to the output 212. Act 506 may be executed simultaneously, sequentially, and/or alternately with act 504. Act 506 may include controlling the DC/AC inverter 210 to provide AC output power to the output 212 with power derived from the first capacitor 418, as illustrated in FIGS. 7A and 7B. Operating the UPS 200 to provide the AC output power may vary with a polarity of the AC-output-power voltage waveform, which may include a positive half-cycle and a negative half-cycle.

FIG. 7A illustrates a schematic diagram of the UPS 200 providing output power derived from the first capacitor 418 during a positive half-cycle of the AC output power according to an example. A boost current 700 is provided by the first capacitor 418 to the third inductor 420, and a freewheeling current 702 is provided by the third inductor 420 to the load 454. To provide the boost current 700, the controller 216 maintains the seventh power switch 440 in a closed and conducting position and operates the eighth power switch 442 as an inverter switch for the positive half-cycle of the output AC power, such that the boost current 700 is provided from the first capacitor 418 through the eighth power switch 442, the third inductor 420, the second capacitor 422, the output line connection 424, the load 454, the output neutral connection 426, and the seventh power switch 440. To provide the freewheeling current 702, the controller 216 maintains the seventh power switch 440 in a closed and conducting position such that the freewheeling current 702 passes from the third inductor 420 through the second capacitor 422, the output line connection 424, the load 454, the output neutral connection 426, the seventh power switch 440, and a body diode of the ninth power switch 444. The third inductor 420 and the second capacitor 422 act as a low-pass filter to the output power.

FIG. 7B illustrates a schematic diagram of the UPS 200 providing output power derived from the first capacitor 418 during a negative half-cycle of the AC output power according to an example. A boost current 750 is provided by the first capacitor 418 to the third inductor 420, and a freewheeling current 752 is provided by the third inductor 420 to the load 454. To provide the boost current 750, the controller 216 maintains the sixth power switch 438 in a closed and conducting position and operates the ninth power switch 444 as an inverter switch for the negative half-cycle of the output AC power, such that the boost current 750 is provided from the first capacitor 418 through the sixth power switch 438, the second capacitor 422, the output neutral connection 426, the load 454, the output line connection 424, the third inductor 420, and the ninth power switch 444. To provide the freewheeling current 752, the controller 216 maintains the sixth power switch 438 in a closed and conducting position such that the freewheeling current 752 passes from the third inductor 420 through a body diode of the eighth power switch 442, the sixth power switch 438, the second capacitor 422, the output neutral connection 426, the load 454, and the output line connection 424. The third inductor 420 and the second capacitor 422 act as a low-pass filter to the output power.

At act 508, the controller 216 determines whether to charge the energy-storage device 220. Act 508 may be executed simultaneously, sequentially, and/or alternately with acts 504 and 506. In one example, the controller 216 may determine whether a charge level of the energy-storage device 220 is below a threshold level of charge. The controller 216 may also determine whether sufficient power is available to charge the energy-storage device 220. For example, the controller 216 may determine that the energy-storage device 220 is only to be charged if there is sufficient power available (for example, from the AC-power source 450) after satisfying the power draw of the load 454.

If the controller 216 determines that the energy-storage device 220 is not to be charged (508 NO), such as because the energy-storage device 220 is sufficiently charged or insufficient charging power is available, then the process 500 continues to act 510, and the process 500 ends. However, the process 500 may be executed repeatedly in some examples such that the process 500 returns to act 502.

Otherwise, if the controller 216 determines that the energy-storage device 220 is to be charged (508 YES), then the process 500 continues to act 512. At act 512, the controller 216 controls the bidirectional converter 214 to charge the energy-storage device 220 during the positive and negative half-cycles of the AC input power. Act 512 may be executed simultaneously, sequentially, and/or alternately with acts 504 and 506. Act 512 may include controlling the bidirectional converter 214 to charge the energy-storage device 220 with power derived from the first capacitor 418, as illustrated in FIGS. 8A and 8B.

Figure 8A:
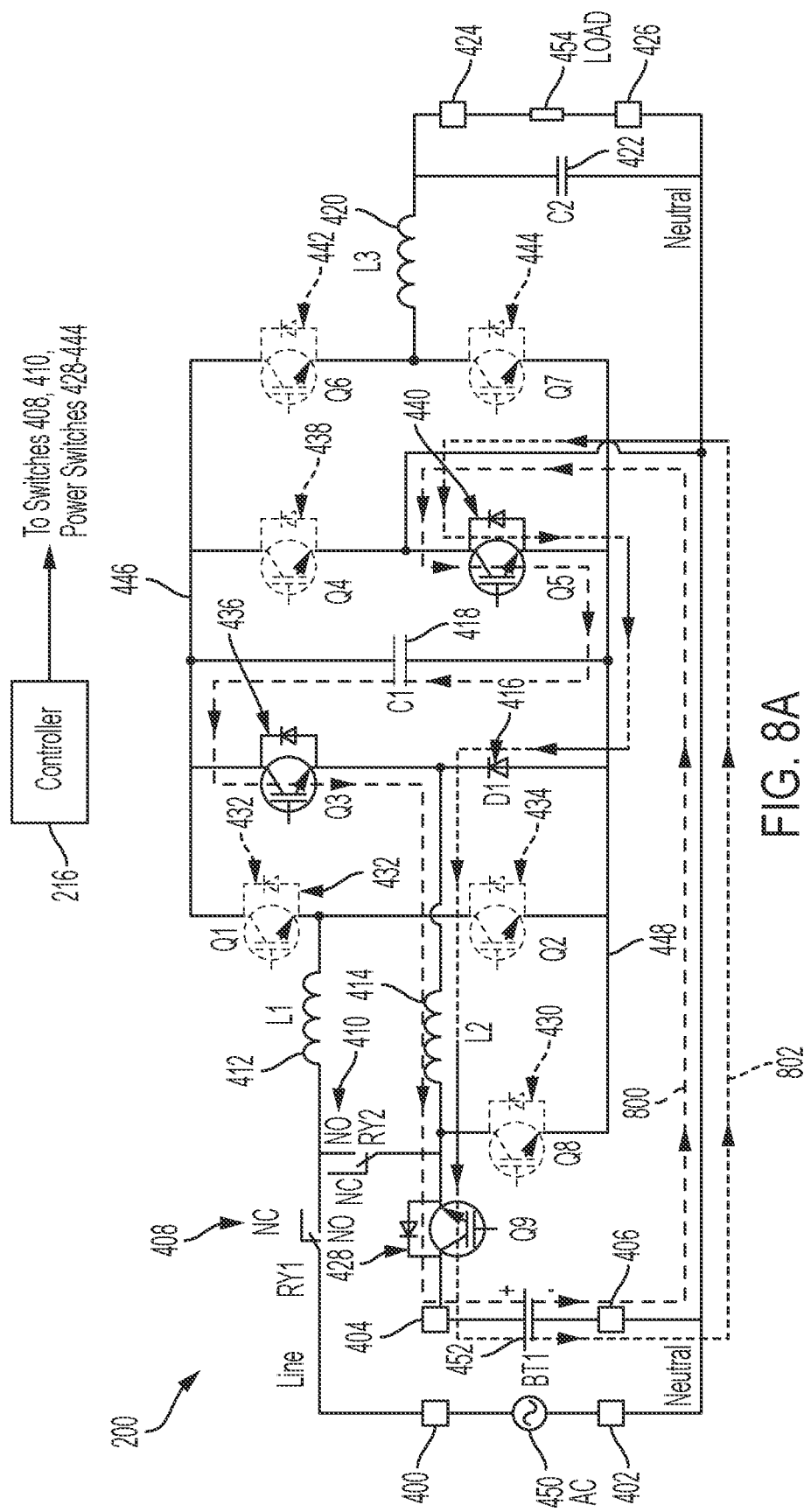
FIG. 8A illustrates a schematic diagram of the UPS of FIG. 4 providing charging power derived from the first capacitor to a DC-power source during the positive half-cycle of the input AC power according to an example.

FIG. 8A illustrates a schematic diagram of the UPS 200 providing charging power derived from the first capacitor 418 to the DC-power source 452 during a positive half-cycle of the AC input power according to an example. A boost current 800 is provided by the first capacitor 418 to the second inductor 414, and a freewheeling current 802 is provided by the second inductor 414 to the DC-power source 452 to charge the DC-power source 452. To provide the boost current 800, the controller 216 operates the fifth power switch 436 as a buck switch and maintains the seventh power switch 440 in a closed and conducting position such that the boost current 800 is provided from the first capacitor 418 to the fifth power switch 436, the second inductor 414, a body diode of the first power switch 428, the positive DC-power-source connection 404, the DC-power source 452, the negative DC-power-source connection 406, and the seventh power switch 440. To provide the freewheeling current 802, the controller 216 maintains the seventh power switch 440 in a closed and conducting position such that the freewheeling current 802 is provided from the second inductor 414 through the body diode of the first power switch 428, the positive DC-power-source connection 404, the DC-power source 452, the negative DC-power-source connection 406, the seventh power switch 440, and the switching device 416 to charge the DC-power source 452.

Figure 8B:
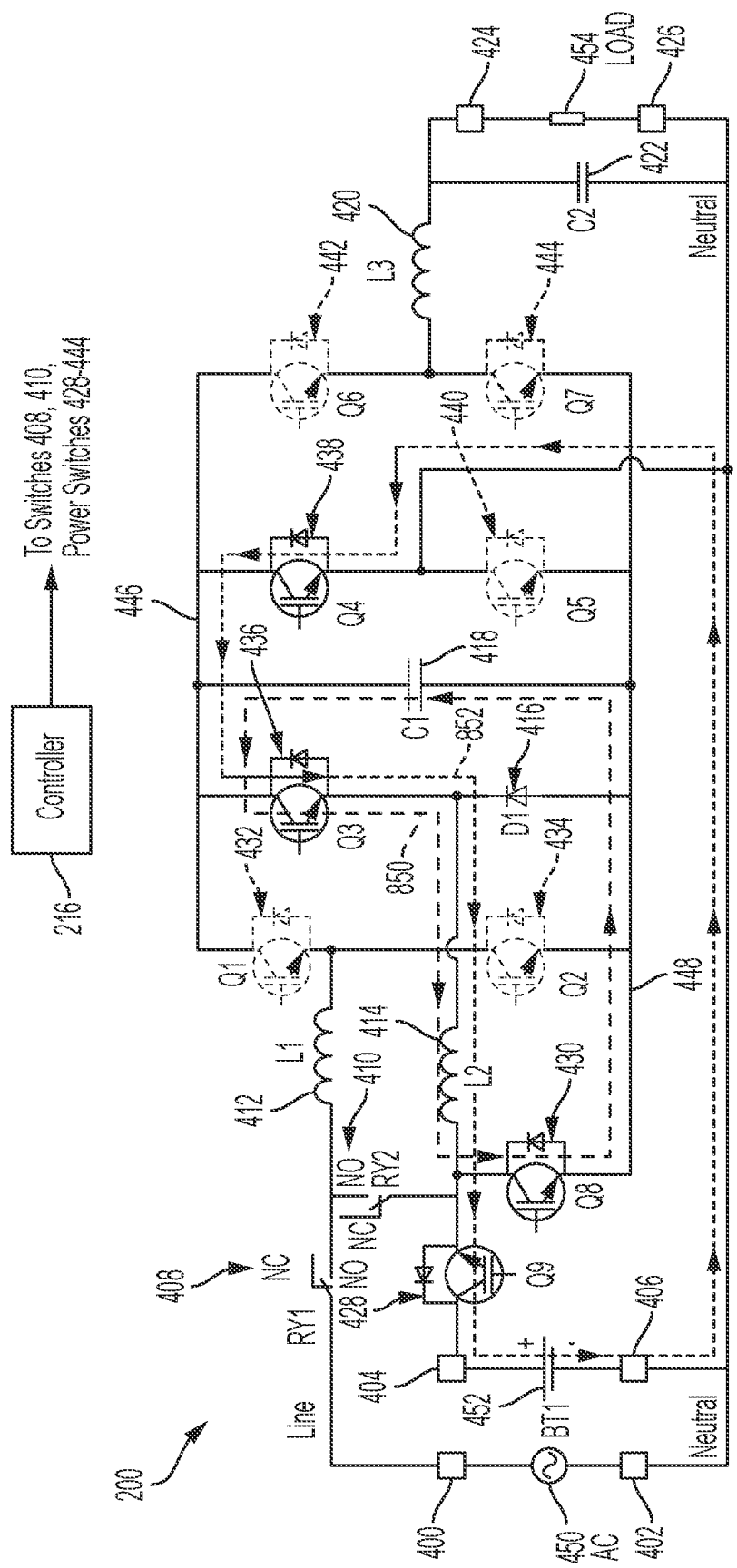
FIG. 8B illustrates a schematic diagram of the UPS of FIG. 4 providing charging power derived from the first capacitor to the DC-power source during the negative half-cycle of the input AC power according to an example.

FIG. 8B illustrates a schematic diagram of the UPS 200 providing charging power derived from the first capacitor 418 to the DC-power source 452 during a negative half-cycle of the AC input power according to an example. A boost current 850 is provided by the first capacitor 418 to the second inductor 414, and a freewheeling current 852 is provided by the second inductor 414 to the DC-power source 452 to charge the DC-power source 452. To provide the boost current 850, the controller 216 operates the second power switch 430 as a buck-boost switch and maintains the fifth power switch 536 in a closed and conducting position such that the boost current 850 is provided from the first capacitor 418 to the fifth power switch 436, the second inductor 414, and the second power switch 430. To provide the freewheeling current 852, the controller 216 maintains the fifth power switch 436 in a closed and conducting position such that the freewheeling current 852 is provided from the second inductor 414 through the body diode of the first power switch 428, the positive DC-power-source connection 404, the DC-power source 452, the negative DC-power-source connection 406, a body diode of the sixth power switch 438, and the fifth power switch 436 to charge the DC-power source 452.

At act 510, the process 500 ends. However, the process 500 may be executed repeatedly in some examples such that the process 500 returns to act 502.

Figure 9:
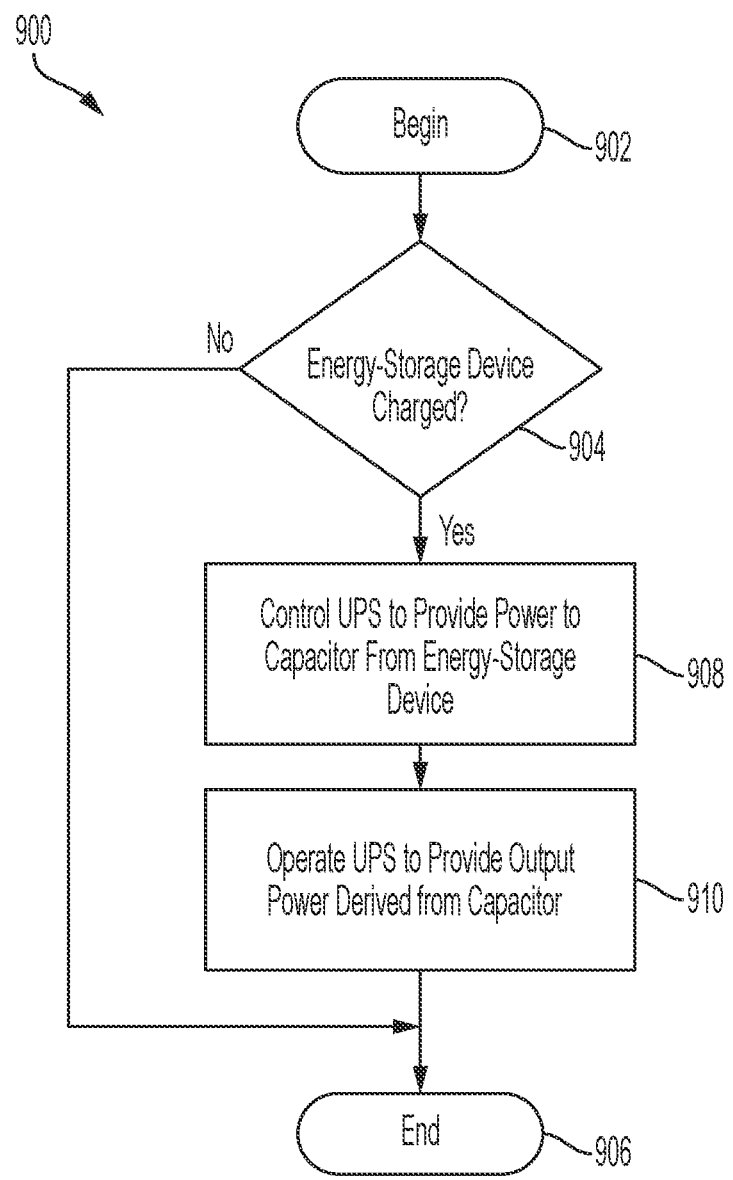
FIG. 9 illustrates a process of operating the UPS of FIG. 2 during a back-up mode of operation according to an example.

As discussed above, the controller 216 may select a mode of operation of the UPS 200 and control the UPS 200 accordingly, including the mains mode of operation and a back-up mode of operation. FIG. 9 illustrates a process 900 of operating the UPS 200 in the back-up mode of operation according to an example. The process 900 may be executed at least in part by the controller 216. For example, the controller 216 may operate the UPS 200 in the back-up mode of operation based on having selected the back-up mode of operation at act 312, above.

At act 902, the process 900 begins.

At act 904, the controller 216 determines whether the energy-storage device 220 is sufficiently charged to provide output power to the output 212. For example, act 904 may include determining whether a charge level of the DC-power source 452 is above a threshold level of charge. If the energy-storage device 220 is not sufficiently charged (904 NO), then the process 900 ends at act 906. Otherwise, if the energy-storage device 220 is sufficiently charged (904 YES), then the process 900 continues to act 908.

Figure 10A:
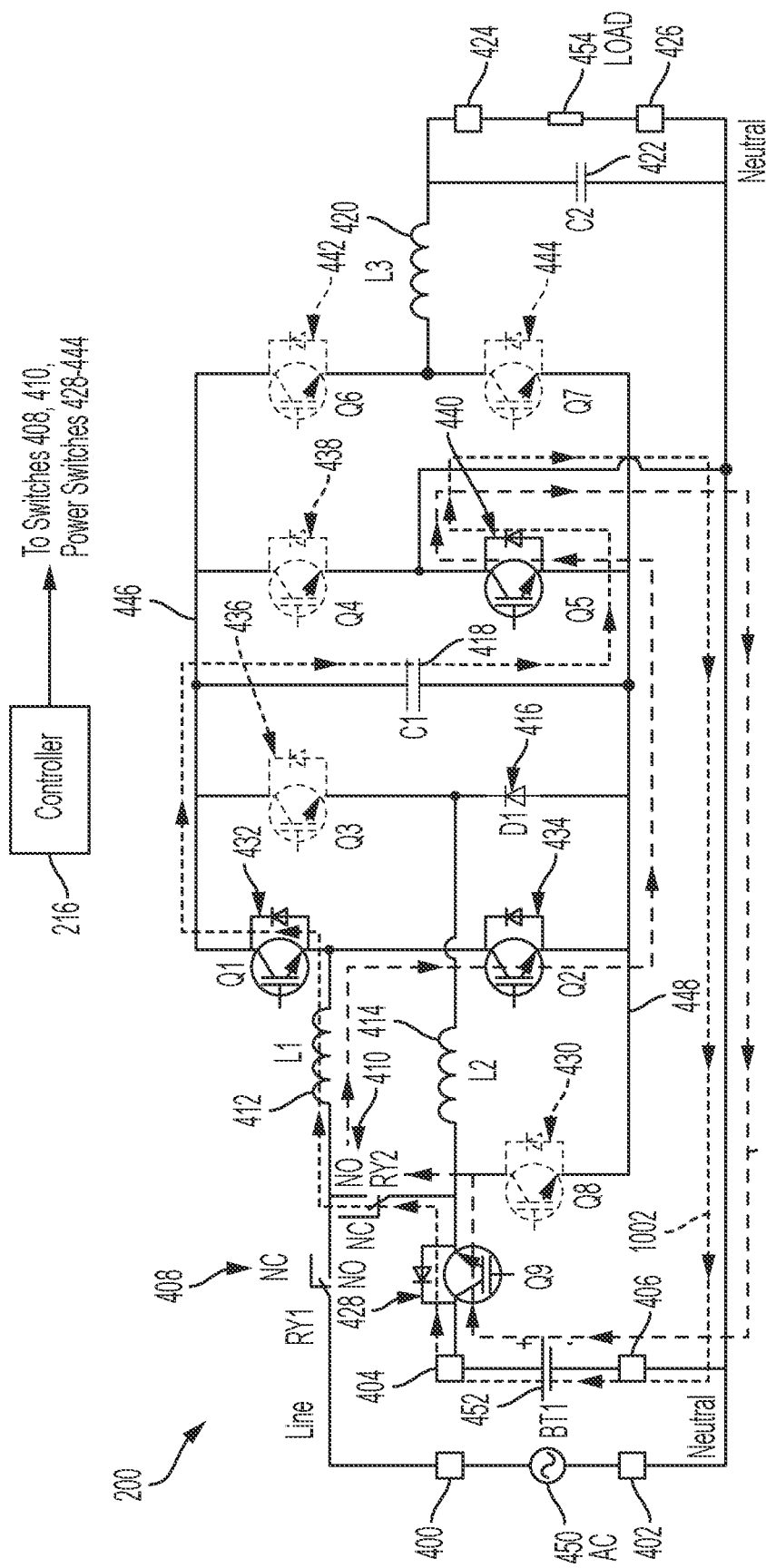
FIG. 10A illustrates a schematic diagram of the UPS of FIG. 4 providing power from the DC-power source to the first capacitor to charge the first capacitor during the positive half-cycle of the output AC power.
Figure 10B:
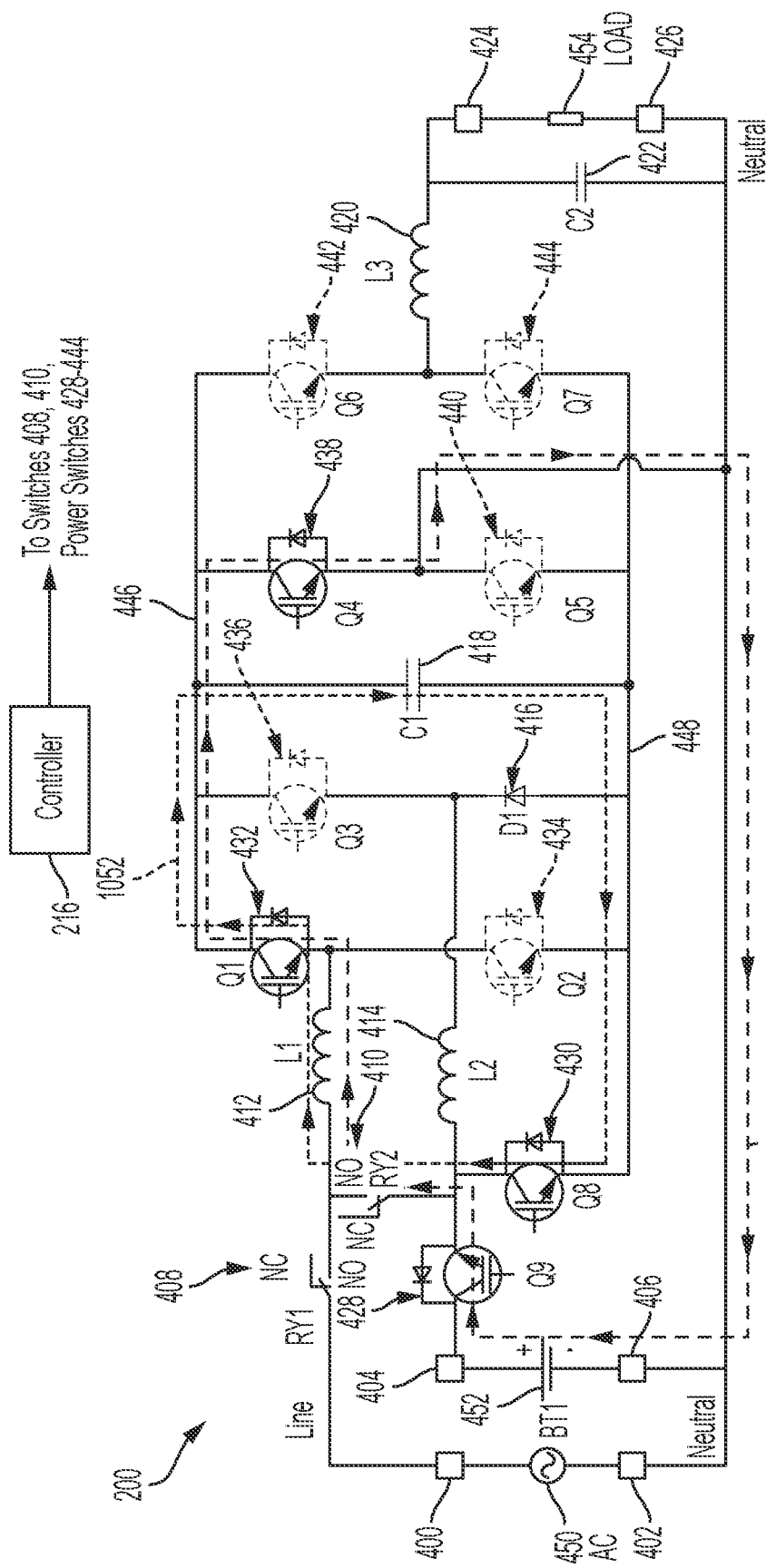
FIG. 10B illustrates a schematic diagram of the UPS of FIG. 4 providing power from the DC-power source to the first capacitor to charge the first capacitor during the negative half-cycle of the output AC power.

At act 908, the controller 216 operates the UPS 200 to provide power from the DC-power source 452 to the first capacitor 418 to charge the first capacitor 418. Act 908 may include controlling the switches 204, PFC 206, DC/AC inverter 210, and bidirectional converter 214 to charge the first capacitor 418 with power derived from the DC-power source 452, as illustrated in FIGS. 10A and 10B. Operating the UPS 200 to charge the first capacitor 418 at act 908 may vary based on a polarity of output voltage provided to the output 212. As discussed above, in one example, the voltage provided to the output 212 includes a positive half-cycle and a negative half-cycle.

FIG. 10A illustrates a schematic diagram of the UPS 200 providing power from the DC-power source 452 to the first capacitor 418 to charge the first capacitor 418 during a positive half-cycle of the output power. A boost current 1000 is provided from the DC-power source 452 to the first inductor 412, and a freewheeling current 1002 is provided from the first inductor 412 to the first capacitor 418. To provide the boost current 1000, the controller 216 maintains the first power switch 428 and the seventh power switch 440 in a closed and conducting position and operates the fourth power switch 434 as a boost switch, such that the boost current 1000 is provided from the DC-power source 452 to the positive DC-power-source connection 404, the first power switch 428, the second switch 410, the first inductor 412, the fourth power switch 434, the seventh power switch 440, and the negative DC-power-source connection 406. To provide the freewheeling current 1002, the controller 216 maintains the first power switch 428 and the seventh power switch 440 in a closed and conducting position such that the freewheeling current 1002 is provided from the first inductor 412 through a body diode of the third power switch 432, the first capacitor 418, the seventh power switch 440, the negative DC-power-source connection 406, the DC-power source 452, the positive DC-power-source connection 404, the first power switch 428, and the second switch 410 to charge the first capacitor 418.

FIG. 10B illustrates a schematic diagram of the UPS 200 providing power from the DC-power source 452 to the first capacitor 418 to charge the first capacitor 418 during a negative half-cycle of the output power. A boost current 1050 is provided from the DC-power source 452 to the first inductor 412, and a freewheeling current 1052 is provided from the first inductor 412 to the first capacitor 418. To provide the boost current 1050, the controller 216 maintains the first power switch 428 in a closed and conducting position and operates the sixth power switch 438 as a buck-boost switch, such that the boost current 1050 is provided from the DC-power source 452 to the positive DC-power-source connection 404, the first power switch 428, the second switch 410, the first inductor 412, a body diode of the third power switch 432, the sixth power switch 438, and the negative DC-power-source connection 406. The freewheeling current 1052 is provided from the first inductor 412 through a body diode of the third power switch 432, the first capacitor 418, a body diode of the second power switch 430, and the second switch 410 to charge the first capacitor 418.

At act 910, the controller 216 operates the UPS 200 to provide output power derived from the first capacitor 418 to the load 454. Act 910 may be substantially similar or identical to act 506, discussed above, and is therefore not repeated. Act 910 may be executed sequentially, substantially simultaneously, and/or alternately with acts 904 and 908.

At act 906, the process 900 ends. However, the process 900 may be executed repeatedly in some examples such that the process 900 returns to act 902.

Accordingly, examples of the UPS 200 provide a power-device topology in which a negative connection of an energy-storage-device interface (for example, the negative DC-power-source connection 406) is shared with a neutral of an input-power connection (for example, the input neutral connection 402), and in which a number of components is reduced relative to examples in which an isolation transformer is implemented.

Although one example schematic diagram of the UPS 200 is provided in FIG. 4, additional examples are within the scope of the disclosure. The first switch 408 and the second switch 410 may include relay devices. For example, the switches 408, 410 may each include single-pole, single-throw relay devices, or single-pole, double-throw relay devices each having one disconnected throw terminal. In another example, the switches 408, 410 may be collectively implemented as a single-pole relay having a pole coupled to the first inductor 412, a first throw terminal coupled to the input line connection 400, a second throw terminal coupled to the first power switch 428, second power switch 430, and second inductor 414, and, optionally, a third disconnected throw terminal. In various examples, relay devices may be normally open or normally closed. In other examples, one or both of the switches 408, 410 may be implemented as other types of switching devices, such as transistors.

The power switches 428-444 may each be implemented as the same or a different type of switch, such as a metal-oxide-semiconductor field-effect transistor (MOSFET), a bipolar junction transistor (BJT), an insulated-gate bipolar transistor (IGBT), a relay, or another type of switching device. In some examples, the switching device 416 may be implemented as a diode, whereas in other examples the switching device 416 may be implemented as a switching device such as a MOFET, BJT, IGBT, and so forth, which may include a body diode. Accordingly, it is to be appreciated that the term "switching device" may include devices such as a diode, MOSFET, BJT, IGBT, relay, and so forth.

Figure 11:
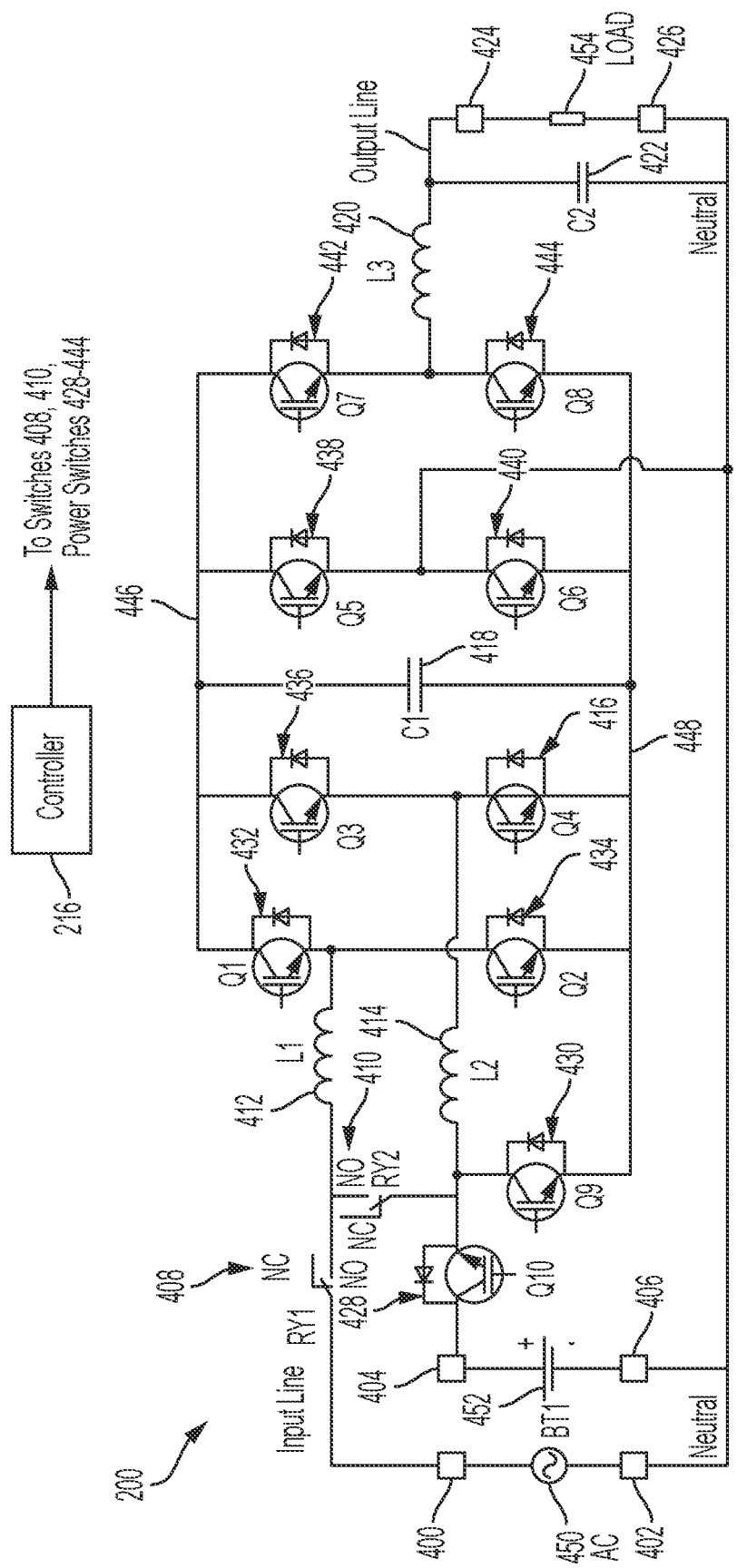
FIG. 11 illustrates a schematic diagram of the UPS of FIG. 2 according to another example.

For example, FIG. 11 illustrates a schematic diagram of the UPS 200 according to another example. The UPS 200 of FIG. 11 is substantially similar to the UPS 200 of FIG. 4, but includes a switching device 1100 in place of the switching device 416. As illustrated by FIG. 11, the switching device 1100 may be implemented as a transistor having a body diode, rather than a diode as illustrated in FIG. 4.

The example of FIG. 11 may advantageously enable the UPS 200 to operate in a dual-boost-converter mode of operation in a back-up mode of operation, such that an inductor ripple current is reduced, a magnetic energy in the inductors 412, 414 is utilized more fully, a ripple current of the DC-power source 452 is reduced, and a larger boost ratio is made available between a voltage of the DC-power source 452 and the first capacitor 418. In some examples of FIG. 11, the second inductor 414 may be utilized as a buck inductor during a positive half-cycle of input power received from the AC-power source 450 to charge the DC-power source 452, and as a buck-boost inductor during a negative half-cycle. Moreover, during the back-up mode of operation, the second inductor 414 may be utilized as a boost inductor.

Various example currents are described above with respect to FIGS. 6A-8B, 10A, and 10B as passing through certain components. In some examples, switching devices (including, for example, the components 408, 410, 428-444) having a switching state controlled by the controller 216 which are not described as conducting a current in each respective example may be controlled to be in an open and non-conducting state, which may be a normally open state. Furthermore, in examples in which one of the power switches 428-444 includes a body diode that is described as conducting a current, the switch to which the body diode corresponds may be otherwise open and non-conducting. In various examples, components through which a current passes are controlled by the controller 216 to be in a closed and conducting state.

As discussed above, operation of components of the UPS 200 may vary based on a polarity of input or output power. For example, operation may differ between a positive half-cycle of input power and a negative half-cycle of input power. In some examples, input or output power may have positive and negative portions which are not equal in magnitude and/or duration. For example, a load may draw more positive-polarity power than negative-polarity power, such that a positive cycle of the output power provides more power than a negative cycle of the output power. Accordingly, no limitation is implied by the term "half-cycle," as the principles of the disclosure are applicable regardless of whether a positive and negative portion of power comprise half of a complete cycle of the power.

In some examples, one or more acts of the processes 300, 500, and/or 900 may be executed substantially sequentially, simultaneously, repeatedly, and so forth. Furthermore, one or more acts of the processes 300, 500, and/or 900 may be optionally executed or non-executed. For example, as discussed above, the process 500 may be executed in a mains mode of operation. Act 506, in which the controller 216 operates the UPS 200 to discharge power from the first capacitor 418 to the output 212, may optionally be not executed in some examples. For example, if no load is connected to the output 212, or if a load is connected but not drawing power, then act 506 may not be executed.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An uninterruptible power supply comprising:
   an input configured to receive input power from an input-power source, the input having a mains neutral connection coupled to a reference node;
   an energy-storage-device interface configured to be coupled to an energy-storage device to provide back-up power, the energy-storage-device interface having an energy-storage-device neutral connection coupled to the reference node;
   an output configured to provide output power derived from at least one of the input power and the back-up power;
   a power-factor-correction circuit (PFC) comprising a PFC input;
   a capacitor coupled to the PFC and being galvanically coupled to the energy-storage-device interface;
   a bidirectional converter coupled to the input and coupled to the energy-storage-device interface;
   a switch coupled to the energy-storage-device interface and to the PFC input; and
   at least one controller configured to:
      control, during a positive half-cycle of the input power, the bidirectional converter to charge the energy-storage device with power derived from the capacitor, and
      control, during a negative half-cycle of the input power, the bidirectional converter to charge the energy-storage device with power derived from the capacitor.

2. The uninterruptible power supply of claim 1, wherein a voltage of the output power is independent of a voltage of the input power.

3. The uninterruptible power supply of claim 1, wherein the switch includes a first connection coupled to the PFC input, and a second connection configured to be coupled to the energy-storage-device interface.

4. The uninterruptible power supply of claim 3, further comprising a first power switch coupled between the energy-storage-device interface and the second connection of the switch.

5. The uninterruptible power supply of claim 4, further comprising:
a second power switch coupled to a first connection of the capacitor;
an inductor coupled between the first power switch and the second power switch; and
a switching device coupled between the inductor and a second connection of the capacitor.

6. The uninterruptible power supply of claim 5, wherein the at least one controller is further configured to control, in a mains mode during the positive half-cycle of the input power, the first power switch and the second power switch to provide a boost current from the capacitor to the inductor through the first power switch and the second power switch.

7. The uninterruptible power supply of claim 6, wherein the at least one controller is further configured to control, in the mains mode during the positive half-cycle of the input power, the first power switch to provide a freewheeling current from the inductor to the energy-storage-device interface through the first power switch and the switching device.

8. The uninterruptible power supply of claim 5, wherein the at least one controller is further configured to control, in a mains mode during the negative half-cycle of the input power, the second power switch and the switching device to provide a boost current from the capacitor to the inductor through the second power switch and the switching device.

9. The uninterruptible power supply of claim 8, wherein the at least one controller is further configured to control, in the mains power during the negative half-cycle of the input power, the first power switch and the second power switch to provide a freewheeling current from the inductor through the first power switch and the second power switch to charge the energy-storage device.

10. The uninterruptible power supply of claim 4, further comprising an inductor coupled between the capacitor and the first connection of the switch, wherein the at least one controller is further configured to control, during a positive half-cycle of the output power during a back-up mode, the first power switch and the switch to provide a boost current from the energy-storage-device interface to the inductor through the first power switch and the switch.

11. The uninterruptible power supply of claim 10, wherein the at least one controller is further configured to control, during the positive half-cycle of the output power during the back-up mode, the first power switch and the switch to provide a freewheeling current from the inductor through the first power switch and the switch to charge the capacitor.

12. The uninterruptible power supply of claim 4, further comprising:
an inductor coupled between a first connection of the capacitor and the first connection of the switch; and
a second power switch coupled between the second connection of the switch and a second connection of the capacitor.

13. The uninterruptible power supply of claim 12, wherein the at least one controller is further configured to control, during the negative half-cycle of the output power during a back-up mode, the first power switch and the switch to provide a boost current from the energy-storage-device interface to the inductor through the first power switch and the switch.

14. The uninterruptible power supply of claim 13, wherein the at least one controller is further configured to control, during the negative half-cycle of the output power during the back-up mode, the second power switch and the switch to provide a freewheeling current from the inductor through the second power switch and the switch to charge the capacitor.

15. The uninterruptible power supply of claim 1, wherein the input includes a mains neutral connection coupled to a reference node, and the energy-storage-device interface includes an energy-storage-device neutral connection coupled to the reference node.

16. A non-transitory computer-readable medium storing thereon sequences of computer-executable instructions for operating an uninterruptible power supply including an input to receive input power and having a mains neutral connection coupled to a reference node, an energy-storage-device interface having an energy-storage-device neutral connection coupled to the reference node and configured to be coupled to an energy-storage device, an output to provide output power, a power-factor-correction circuit (PFC) comprising a PFC input coupled to a capacitor galvanically coupled to the energy-storage-device interface, a bidirectional converter coupled to the input and to the energy-storage-device interface, and a switch coupled to the energy-storage-device interface and to the PFC input, the sequences of computer-executable instructions including instructions that instruct at least one processor to:
select, based on input power received at the input, a mode of operation including one of a back-up mode or a mains mode;
control, during a positive half-cycle of the input power in the mains mode, the bidirectional converter to charge the energy-storage device with power derived from the capacitor; and
control, during a negative half-cycle of the input power in the mains mode, the bidirectional converter to charge the energy-storage device with power derived from the capacitor.

17. The non-transitory computer-readable medium of claim 16, wherein the uninterruptible power supply further includes a first power switch coupled between the energy-storage-device interface and the switch, a second power switch coupled to a first connection of the capacitor, an inductor coupled between the first power switch and the second power switch, and a switching device coupled between the inductor and a second connection of the capacitor, wherein the instructions further instruct the at least one processor to:
control, in the mains mode during a positive half-cycle of the input power, the first power switch and the second power switch to provide a boost current from the capacitor to the inductor through the first power switch and the second power switch; and
control, in the mains mode during the positive half-cycle of the input power, the first power switch to provide a freewheeling current from the inductor to the energy-storage device through the first power switch and the switching device.

18. The non-transitory computer-readable medium of claim 16, wherein the uninterruptible power supply further includes a first power switch coupled between the energy-storage-device interface and the switch, a second power switch coupled to a first connection of the capacitor, an inductor coupled between the first power switch and the second power switch, and a switching device coupled between the inductor and a second connection of the capacitor, wherein the instructions further instruct the at least one processor to:

control, in the mains mode during a negative half-cycle of the input power, the second power switch and the switching device to provide a boost current from the capacitor to the inductor through the second power switch and the switching device; and control, in the mains power during the negative half-cycle of the input power, the first power switch and the second power switch to provide a freewheeling current from the inductor through the first power switch and the second power switch to charge the energy-storage-device.

19. A method of operating an uninterruptible power supply including an input to receive input power and having a mains neutral connection coupled to a reference node, an energy-storage-device interface having an energy-storage-device neutral connection coupled to the reference node and configured to be coupled to an energy-storage device, an output to provide output power, a power-factor-correction circuit (PFC) comprising a PFC input coupled to a capacitor galvanically coupled to the energy-storage-device interface, a bidirectional converter coupled to the input and to the energy-storage-device interface, and a switch coupled to the energy-storage-device interface and to the PFC input, the method comprising:

controlling, during a positive half-cycle of the input power, the bidirectional converter to charge the energy-storage device with power derived from the capacitor; and controlling, during a negative half-cycle of the input power, the bidirectional converter to charge the energy-storage device with power derived from the capacitor.

* * * * *